(12) United States Patent
Teshome et al.

(10) Patent No.: US 11,924,290 B2
(45) Date of Patent: Mar. 5, 2024

(54) AGGREGATED STOCHASTIC METHOD FOR PREDICTIVE SYSTEM RESPONSE

(71) Applicant: Dell Products, LP, Round Rock, TX (US)

(72) Inventors: Abeye Teshome, Austin, TX (US); Sinem Gulbay, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 1347 days.

(21) Appl. No.: 16/172,483

(22) Filed: Oct. 26, 2018

(65) Prior Publication Data
US 2020/0134394 A1   Apr. 30, 2020

(51) Int. Cl.
| | |
|---|---|
| G06N 5/04 | (2023.01) |
| G06F 18/25 | (2023.01) |
| G06N 3/04 | (2023.01) |
| G06N 3/08 | (2023.01) |
| G06N 7/01 | (2023.01) |
| H04L 67/306 | (2022.01) |

(52) U.S. Cl.
CPC ............ *H04L 67/306* (2013.01); *G06F 18/25* (2023.01); *G06N 3/0418* (2013.01); *G06N 3/08* (2013.01); *G06N 5/04* (2013.01); *G06N 7/01* (2023.01)

(58) Field of Classification Search
None
See application file for complete search history.

(56) References Cited

U.S. PATENT DOCUMENTS

| | | | |
|---|---|---|---|
| 7,761,144 B2 | 7/2010 | Cox | |
| 7,778,943 B2 | 8/2010 | Guralnik | |
| 9,530,101 B1 | 12/2016 | Hyland | |
| 2005/0203643 A1 | 9/2005 | Jackson | |
| 2014/0336787 A1 | 11/2014 | Endel | |

OTHER PUBLICATIONS

Siegel, et al., The Future Internet of Things: Secure, Efficient, and Model-Based, IEEE Internet of Things Journal 5, 4, Aug. 2018, pp. 2386-2398 (Year: 2018).*
D.J.C. MacKay, "Bayesian Interpolation," May 21, 1991, 33 pages.

* cited by examiner

*Primary Examiner* — Wilbert L Starks
(74) *Attorney, Agent, or Firm* — Prol Intellectual Property Law, PLLC; H. Kenneth Prol

(57) ABSTRACT

An information handling system operating a sensor fusion prediction based automatic adjustment system may comprise sensors measuring influencing attributes comprising information handling system operational values, wherein a subset of the influencing attributes influence one of a plurality of system characteristics, and a memory storing definitions of a user behavior characteristic, a performance mapping characteristic, a power status characteristic, a security profile characteristic, and a policy configuration characteristic. A processor may execute code instructions to apply stochastic prediction to the subset of influencing attribute values to predict a future value of a system characteristic influenced by the subset of influencing attribute values at a future instance in time, determine an adjustment to a policy controlling operational bounds of the system characteristic if the predicted future value of the system characteristic falls outside current policy-defined operating bounds, and automatically perform the policy adjustment before the future instance in time.

20 Claims, 6 Drawing Sheets

AGGREGATED STOCHASTIC METHOD FOR PREDICTIVE SYSTEM RESPONSE

FIELD OF THE DISCLOSURE

The present disclosure generally relates to adaptive adjustment of information handling system performance characteristics. The present disclosure more specifically relates to an aggregated stochastic method using a sensor fusion algorithm for predictive response and automatic adjustment to one or more information handling system operational characteristics.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling needs and requirements vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. Further, the information handling system may include a plurality of sensor devices for measuring functionality, security, location, and/or resource handling of an information handling system.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
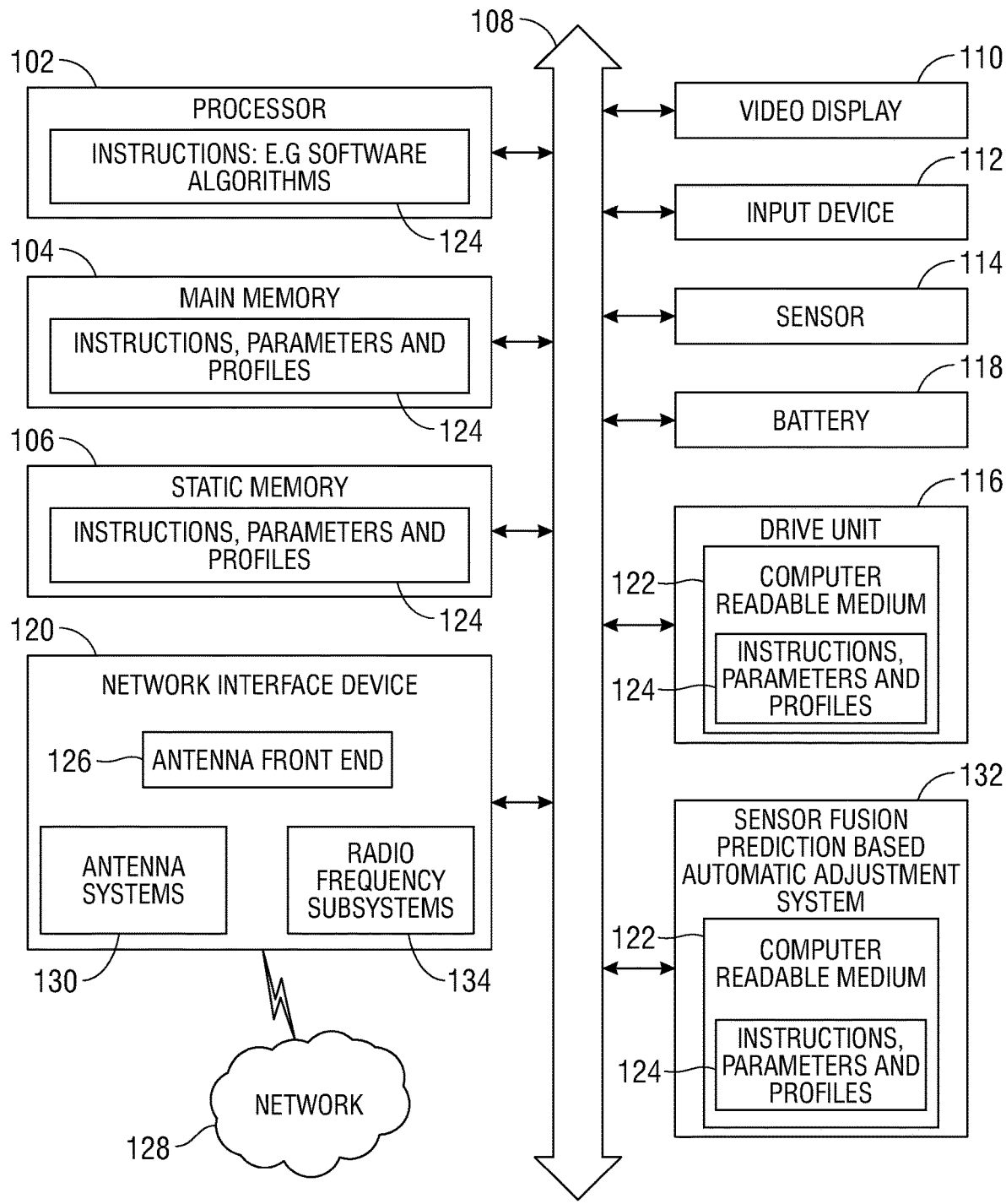
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Optimizing functional performance is an ongoing goal for manufacturers of all information handling systems and operating systems for those information handling systems. Such optimal performance may involve efficient consumption of computing resources (e.g. memory, battery power, processing power, etc.), adaptively optimizing wireless communication links, and providing adequate security for a given situation, among other considerations. Information handling systems in the existing art attempt to optimize performance characteristics based on past performance characteristics. In other words, such existing information handling systems optimize performance only in response to a change in operation that has already occurred. A method is needed to predict the timing of such changes in operation, and to automatically adjust performance of an information handling system prior to or at the time the change in operation occurs in order to maintain seamless optimization.

The sensor fusion prediction based automatic adjustment system in embodiments of the present disclosure address such issues by predicting future states of certain performance metrics and adjusting policies controlling those metrics for optimal performance in real time. Such a method may include first determining the ways in which a plurality of influencing attributes affect each of a plurality of system characteristics. Influencing attributes in embodiments of the present disclosure may describe operating conditions for the information handling system, and system characteristics may describe performance metrics that may be affected by one or more influencing attributes.

Influencing attributes may include, for example, application profiles, policy adjustments, functionality profiles, and power profiles for the information handling system, or for individual components or programs of the information handling system. Further example influencing attributes may include feature/capability mapping, network profiles, hour/day mapping, attribute profiles, threat profiles, location mapping, and historical performance for the information handling system, or for individual components or programs of the information handling system. Yet further examples of influencing attributes for an information handling system or subcomponents thereof may include management profiles, configuration adjustment profiles, and default setting delta profiles.

Each of these attributes may also be interrelated with one or more other influencing attributes. For example, a network profile influencing attribute (e.g. RSSI value) may be interrelated with a location mapping influencing attribute (e.g. distance from a known network base station). Some embodiments may further measure the interrelation between two or more influencing attributes via a functionality profile influencing attribute that measures the number of times over a given time period one of the influencing attributes affected the value of one or more other influencing attributes.

The influencing attributes in embodiments of the present disclosure may provide highly granular information about the performance of an information handling system or a subcomponent thereof. Adjustments made to the functional performance of the information handling system in response to predicted changes in performance may be made at a higher-level, less granular level. For example, adjustments may be made to higher-level system characteristics, such as a power subsystem. Such a subsystem in embodiments of the present disclosure may, for example, dictate the power consumed by one or more processes or sub-components of the information handling system. An example adjustment to such a power system may include, for example, decreasing the amount of power consumed by the video display of an information handling system by decreasing the intensity at which light is emitted or by moving the video display from an always on state to a state in which the screen hibernates after two minutes of inactivity. The system functionality characteristics of the information handling system to which such higher-level adjustments may be made in embodiments of the present disclosure may be referred to herein as system characteristics. Each of the system characteristics in embodiments of the present disclosure may be measured directly. For example, the power status system characteristic may measure the amount of power received and consumed by each subcomponent (e.g. the video display) of the information handling system, and/or may determine whether the information handling system is currently plugged into a wall outlet or is operating on battery power alone.

Each of the higher-level system characteristics in an embodiment may be affected by one or more influencing attributes. For example, power consumption and network connectivity may be influencing attributes that affect or dictate the state of a system characteristic describing power status. The power consumption influencing attribute may indicate, for example, that the information handling system is currently plugged into an A/C outlet, and the network connectivity influencing attribute may indicate a greater than average amount of power is being used to transmit data via the information handling system antenna in order to maintain signal strength. These influencing attributes (e.g. A/C power and high power consumption at the antenna) may cause the power status for the information handling system to operate outside the bounds dictated by a currently enforced low-power policy, prompting a need to shift toward a full-power policy in which power supplied to the antenna will not be limited or capped.

The sensor fusion prediction based automatic adjustment system described in embodiments of the present disclosure may determine which influencing attributes affect the values of each system characteristic using an iterative statistical inference method. Such a statistical inference algorithm (e.g. Bayesian inference and Bayesian updating, or the Dutch Book approach) may determine the probability that any possible combination of given influencing attributes caused or significantly affected a measured system characteristic. Determination of which influencing attributes affect the settings/measurements/values of a given system characteristic may be implemented with a machine learning system in other embodiments. The sensor fusion prediction based automatic adjustment system may apply one or more applications of machine learning algorithms to map one or more influencing attributes described herein to an output setting or value of one or more system characteristics via a learned target function.

Once the sensor fusion prediction based automatic adjustment system in embodiments determines the relationships between each influencing attribute and each system characteristic, it may enter a prediction phase, in which it predicts future states of one or more system characteristics based on measured values of the one or more influencing attributes over time and the known relationships between each system characteristic and each influencing attribute. The sensor fusion prediction based automatic adjustment system may perform a sensor fusion algorithm on all predicted future values of the influencing attributes to predict future states of each of the plurality of system characteristics and to decrease the uncertainty associated with each predicted future state. By analyzing future states for each of the plurality of influencing attributes using a fusion algorithm, the predictive attribute fusion algorithm may determine future states of each of the system characteristics with a greater degree of certainty than methods of determining the future state of only one system characteristic at a time. This may be due to the interrelated nature of each of the system characteristics.

The sensor fusion prediction based automatic adjustment system in embodiments of the present disclosure may determine that a predicted future state of a system characteristic is disallowed by current policies or settings. In such a scenario, the sensor fusion prediction based automatic adjustment system may determine an adjusted setting or policy associated with that system characteristic that will allow the predicted state of the system characteristic that is disallowed by the current setting or policy. Each of the possible states of the system characteristics in an embodiment may be associated with one or more policies or configurations in a memory, such that the relationships between each possible state of a given system characteristic and the policies and/or configurations that allow or disallow such a state to occur are known. The sensor fusion prediction based automatic adjustment system in an embodiment may access such relational descriptions stored in memory in order to identify the policies/configurations known to allow the anticipated future state of the system characteristic.

In some embodiments, the sensor fusion prediction based automatic adjustment system may automatically adjust the policies/configurations associated with that system characteristic in order to allow the anticipated future state thereof. In other embodiments, prior to performing the adjustment, the sensor fusion prediction based automatic adjustment system may determine whether such an adjustment will cause changes to the future states of other system characteristics. In such embodiments, if it is determined the adjustment will not adversely affect other system characteristic settings, the sensor fusion prediction based automatic adjustment system may automatically perform the needed adjustment. However, if it is determined the adjustment will adversely affect other system characteristic settings, the sensor fusion prediction based automatic adjustment system in embodiments may determine a plurality of adjustments to more than one system characteristic setting are required in order to optimize policy/configurations such that each of the predicted future states are allowable under future policies. The sensor fusion prediction based automatic adjustment system in embodiments may then automatically perform all of the identified adjustments, in anticipation of those future states. In such a way, the sensor fusion prediction based automatic adjustment system may adjust the functionality of the information handling system without the user experiencing low-quality performance, and without the user having to manually change any settings of the system. The sensor fusion prediction based automatic adjustment system in embodiments of the present disclosure may thus anticipate such a needed system characteristic adjustment prior to such a need arising, and automatically perform such an adjustment, providing seamlessly optimized performance of the information handling system.

FIG. 1 illustrates an information handling system 100 similar to information handling systems according to several aspects of the present disclosure. In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP), a base station transceiver, a wireless telephone, a land-line telephone, a control system, a camera, a scanner, a facsimile machine, a printer, a pager, a personal trusted device, a web appliance, or any other suitable machine capable of executing a set of instructions (sequential or otherwise) that specify actions to be taken by that machine, and can vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the computer system 100 can be implemented using electronic devices that provide voice, video or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

Information handling system 100 can include devices or modules that embody one or more of the devices or execute instructions for the one or more systems and modules described above, and operates to perform one or more of the methods described above. The information handling system 100 may execute code instructions 124 that may operate on servers or systems, remote data centers, or on-box in individual client information handling systems according to various embodiments herein. In some embodiments, it is understood any or all portions of code instructions 124 may operate on a plurality of information handling systems 100.

The information handling system 100 may include a processor 102 such as a central processing unit (CPU), control logic or some combination of the same. Any of the processing resources may operate to execute code that is either firmware or software code. Moreover, the information handling system 100 can include memory such as main memory 104, static memory 106, computer readable medium 122 storing instructions 124 of the sensor fusion prediction based automatic adjustment system 132, and drive unit 116 (volatile (e.g. random-access memory, etc.), nonvolatile (read-only memory, flash memory etc.) or any combination thereof). The information handling system 100 can also include one or more buses 108 operable to transmit communications between the various hardware components such as any combination of various input and output (I/O) devices.

As shown, the information handling system 100 may further include a video display 110. The video display 110 in an embodiment may function as a liquid crystal display (LCD), an organic light emitting diode (OLED), a flat panel display, a solid state display, or a cathode ray tube (CRT). Additionally, the information handling system 100 may include an alpha numeric input device 112, such as a keyboard, and/or a cursor control device, such as a mouse, touchpad, or gesture or touch screen input. The information handling system 100 can also include one or more sensors 114, a battery 118, and a disk drive unit 116. The sensor 114 in an embodiment may be any device capable of recording measurements of the environment immediately surrounding the information handling system 100, or any metrics describing the operational efficiency of the information handling system 100. Examples of sensors 114 in an embodiment may include may include a digital chronometer for providing hour/day measurements, a GPS sensor providing location measurements, an accelerometer within the GPS sensor providing measurements of the current configuration of the information handling system (e.g. clamshell mode, tablet mode, tent mode), and an antenna front end sensor providing communication link quality measurements. Sensors 114 may further include a metric recording system capable of monitoring various metrics of the information handling system operating system performance, including operating characteristics of the input device 112, the video display 110, and the battery 118.

The network interface device shown as wireless adapter 120 can provide connectivity to a network 128, e.g., a wide area network (WAN), a local area network (LAN), wireless local area network (WLAN), a wireless personal area network (WPAN), a wireless wide area network (WWAN), or other network. Connectivity may be via wired or wireless connection. Wireless adapter 120 may include one or more radio frequency subsystems 134 with transmitter/receiver circuitry, modem circuitry, one or more unified radio frequency front end circuits, one or more wireless controller circuits, amplifiers, antenna systems 130 and other radio frequency subsystem circuitry for wireless communications via multiple radio access technologies. Each radiofrequency subsystem 134 may communicate with one or more wireless technology protocols. The radiofrequency subsystem 134 may contain individual subscriber identity module (SIM) profiles for each technology service provider and their available protocols for subscriber based radio access technologies such as cellular LTE communications. The wireless adapter 120 may also include antenna systems 130 which may be tunable antenna systems for use with the system and methods disclosed herein. In some embodiments a network interface device 120 may contain up to four antenna systems 130.

In some aspects of the present disclosure, one wireless adapter 120 may operate two or more wireless links, and up to four wireless links, or one wireless link per antenna. In a further aspect, the wireless adapter 120 may operate the two or more wireless links with a single, shared communication frequency band such as with the 5G standard relating to unlicensed wireless spectrum for small cell 5G operation or for unlicensed Wi-Fi WLAN operation in an example aspect. For example, a 5 GHz wireless communication frequency band may be apportioned under the 5G standards for communication on either small cell WWAN wireless link operation or Wi-Fi WLAN operation. In some embodiments, the shared, wireless communication band may be transmitted through one or a plurality of antennas. Other shared communication frequency bands are contemplated for use with the embodiments of the present disclosure as well.

In other aspects, the information handling system 100 operating as a mobile information handling system may operate a plurality of wireless adapters 120 for concurrent radio operation in one or more wireless communication bands. The plurality of wireless adapters 120 may further share a wireless communication band or operate in nearby wireless communication bands in some disclosed embodiments. Further, harmonics and other effects may impact wireless link operation when a plurality of wireless links are operating concurrently as in some of the presently described embodiments. The proximity of concurrent radio transmission or reception in a shared band or interfering bands precipitates a need to assess concurrently operating antenna systems and potentially make antenna system adjustments according to the antenna optimization system of the present disclosure.

The wireless adapter 120 may operate in accordance with any wireless data communication standards. To communicate with a wireless local area network, standards including IEEE 802.11 WLAN standards, IEEE 802.15 WPAN standards, WWAN such as 3GPP or 3GPP2, or similar wireless standards such as Bluetooth may be used. Wireless adapter 120 may connect to any combination of macro-cellular wireless connections including 2G, 2.5G, 3G, 4G, 5G or the like from one or more service providers. Utilization of radiofrequency communication bands according to several example embodiments of the present disclosure may include bands used with the WLAN standards and WWAN carriers, which may operate in both license and unlicensed spectrums. For example, both WLAN and WWAN may use the Unlicensed National Information Infrastructure (U-NII) band which typically operates in the 5.170-~5 MHz frequency band such as 802.11 a/h/j/n/ac/ad/ax (e.g., center frequencies between 5.170-5.785 GHz), and in the 60 GHz and 80 GHz bands such as 802.11ad. It is understood that any number of available channels may be available under the 5 GHz shared communication frequency band. WLAN, for example, may also operate at a 2.4 GHz band. WWAN may operate in a number of bands, some of which are propriety but may include a wireless communication frequency band at approximately 2.5 GHz band for example. In additional examples, WWAN carrier licensed bands may operate at frequency bands of approximately 700 MHz, 800 MHz, 1900 MHz, or 1700/2100 MHz for example as well. In the example embodiment, mobile information handling system 100 includes both unlicensed wireless radio frequency communication capabilities as well as licensed wireless radio frequency communication capabilities. For example, licensed wireless radio frequency communication capabilities may be available via a subscriber carrier wireless service.

The wireless adapter 120 can represent an add-in card, wireless network interface module that is integrated with a main board of the information handling system or integrated with another wireless network interface capability, or any combination thereof. In an embodiment the wireless adapter 120 may include one or more radio frequency subsystems 130 including transmitters and wireless controllers for connecting via a multitude of wireless links. In an example embodiment, an information handling system may have an antenna system transmitter 130 for 5G small cell WWAN, Wi-Fi WLAN or WiGig connectivity and one or more additional antenna system transmitters 130 for macro-cellular communication. The radio frequency subsystems 134 include wireless controllers to manage authentication, connectivity, communications, power levels for transmission, buffering, error correction, baseband processing, and other functions of the wireless adapter 120.

The radio frequency subsystems 134 of the wireless adapters may also measure various metrics relating to wireless communication pursuant to operation of an antenna optimization system as in the present disclosure. For example, the wireless controller of a radio frequency subsystem 134 may manage detecting and measuring received signal strength levels, bit error rates, signal to noise ratios, latencies, jitter, and other metrics relating to signal quality and strength. In one embodiment, a wireless controller of a wireless interface adapter 120 may manage one or more radio frequency subsystems 134.

The present disclosure contemplates a computer-readable medium that includes instructions, parameters, and profiles 124 or receives and executes instructions, parameters, and profiles 124 responsive to a propagated signal; so that a device connected to a network 128 can communicate voice, video or data over the network 128. Further, the instructions 124 may be transmitted or received over the network 128 via the network interface device or wireless adapter 120.

The information handling system 100 can include a set of instructions 124 that can be executed to cause the computer system to perform any one or more of the methods or computer based functions disclosed herein. For example, instructions 124 may execute a sensor fusion prediction based automatic adjustment system 132, software agents, or other aspects or components. Various software modules comprising application instructions 124 may be coordinated by an operating system (OS), and/or via an application programming interface (API). An example operating system may include Windows®, Android®, and other OS types known in the art. Example APIs may include WinAPIs (e.g. Win32, Win32s, Win64, and WinCE), Core Java API, or Android APIs.

The disk drive unit 116 and the sensor fusion prediction based automatic adjustment system 132 may include a computer-readable medium 122 in which one or more sets of instructions 124 such as software can be embedded. Similarly, main memory 104 and static memory 106 may also contain a computer-readable medium for storage of one or more sets of instructions, parameters, or profiles 124 including one or more multiplexer configuration scheme tables and/or one or more data stream configuration scheme tables. The disk drive unit 116 and static memory 106 also contain space for data storage. Further, the instructions 124 may embody one or more of the methods or logic as described herein. For example, instructions relating to the sensor fusion prediction based automatic adjustment system and ad-hoc routing algorithms may be stored here. In a particular embodiment, the instructions, parameters, and profiles 124 may reside completely, or at least partially, within the main memory 104, the static memory 106, and/or within the disk drive 116 during execution by the processor 102 of information handling system 100. As explained, some or all of the sensor fusion prediction based automatic adjustment system may be executed locally or remotely. The main memory 104 and the processor 102 also may include computer-readable media.

Main memory 104 may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The sensor fusion prediction based automatic adjustment system 132 and the drive unit 116 may include a computer-readable medium 122 such as a magnetic disk in an example embodiment. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The information handling system 100 may also include a sensor fusion prediction based automatic adjustment system 132 that may be operably connected to the bus 108. The sensor fusion prediction based automatic adjustment system 132 computer readable medium 122 may also contain space for data storage. The sensor fusion prediction based automatic adjustment system 132 may perform tasks related to predicting state changes in one or more information handling system characteristics based on received measurements of sensor data or system metrics and automatically performing those expected state changes. In an embodiment, the sensor fusion prediction based automatic adjustment system 132 may communicate with the main memory 104, the processor 102, the video display 110, the alpha-numeric input device 112, the sensors 114, the battery 118, and the network interface device 120 via bus 108, and several forms of communication may be used, including ACPI, SMBus, a 24 MHZ BFSK-coded transmission channel, or shared memory.

In other embodiments, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Further, in an exemplary, non-limited embodiment, implementations can include distributed processing, component/object distributed processing, and parallel processing. Alternatively, virtual computer system processing can be constructed to implement one or more of the methods or functionality as described herein. Accordingly, the present system encompasses software, firmware, and hardware implementations.

When referred to as a "system", a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The system, device, controller, or module can include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module can also include a combination of the foregoing examples of hardware or software. Note that an information handling system can include an integrated circuit or a board-level product having portions thereof that can also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another can communicate directly or indirectly through one or more intermediaries.

Figure 2:
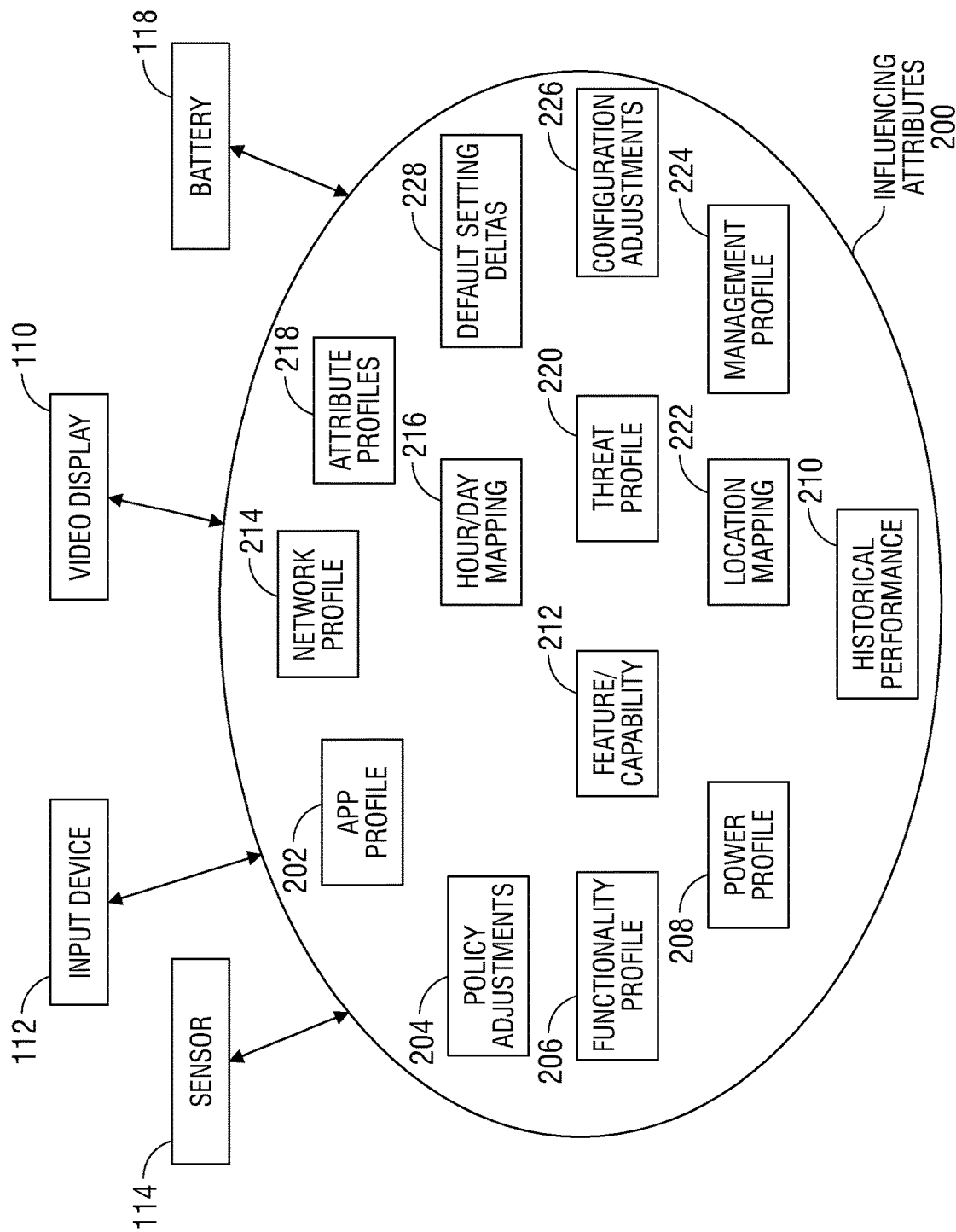
FIG. 2 is a block diagram illustrating a plurality of influencing attributes according to an embodiment of the present disclosure.

FIG. 2 is a block diagram illustrating a plurality of sensors, peripheral devices and influencing attributes according to an embodiment of the present disclosure. The sensor fusion prediction based automatic adjustment system in embodiments of the present disclosure may perform a sensor fusion algorithm on a plurality of influencing attributes or metrics measured by sensors within the information handling system. In such a way, the sensor fusion prediction based automatic adjustment system may optimally adapt to expected changes in performance that may occur in the future.

Several different types of sensor measurements or system metrics may be received by a plurality of sensors 114 and peripheral or internal devices in an embodiment. Example peripheral and/or internal devices in an embodiment may include input device 112, the video display 110, and the battery 118. Example sensors 114 may include a digital chronometer for providing hour/day measurements, a GPS sensor providing location measurements, an accelerometer providing measurements of the current positional configuration of the information handling system (e.g. clamshell mode, tablet mode, tent mode), and an antenna front end sensor providing communication link quality measurements. Sensors 114 may further include a metric recording system capable of monitoring various metrics of the information handling system operating system performance, including operating characteristics of the input device 112, the video display 110, and the battery 118. Such metrics may act as influencing attributes 200 to affect system characteristics in a number of ways.

Influencing attributes 200 may include, for example, application profiles 202, policy adjustments 204, functionality profiles 206, and power profiles 208 for the information handling system, or for individual components or programs of the information handling system. An application profile 202 influencing attribute in an embodiment may identify which applications are running and/or the applications with which a user is actively engaged. In an embodiment, a policy adjustment 204 influencing attribute may describe details of adjustments made to policies specific to the information handling system such as battery consumption policies, waking/hibernating policies, user-recognition policies, and security policies, for example. A functionality profile 206 influencing attribute in an embodiment may identify relationships between one or more other influencing attributes. For example, a functionality profile influencing attribute 206 may identify the number of times over a training period in which each of the other influencing attributes (e.g. 202, 204, or 210-228) affected the value of another one of the other influencing attributes, and/or may identify each of the other influencing attributes it affected. In an embodiment, a power policy influencing attribute may describe battery consumption policies, waking/hibernating policies, receipt of push notifications, and/or wireless communication policies (e.g. use of one or more multi-radio access technology antennas), for example.

Further example influencing attributes may include historical performance 210, feature/capability mapping 212, network profiles 214, hour/day mapping 216, attribute profiles 218, threat profiles 220, and location mapping 222 for the information handling system, or for individual components or programs of the information handling system. In an embodiment, a historical performance profile 210 influencing attribute may describe consumption of a plurality of different computing resources (e.g. memory, processing power, battery power, etc.) over time. A feature/capability influencing attribute 212 in an embodiment may describe enablement/disabling of advanced features such as special accessibility options (e.g. closed captioning), use of an augmented or virtual reality user interface, wirelessly projecting an information handling system screen contents to a nearby display device, connecting one or more external video displays 110, and/or use of Bluetooth connectivity to a nearby device, use of other operably connected accessory devices such as fingerprint scanners, web or video cameras, three-dimensional cameras, etc. In an embodiment, a network profile influencing attribute 214 may identify one or more networks to which an information handling system is connected, and/or performance characteristics of each communication link established (e.g. RSSI, congestion score, frequency, data rate). An hour/day mapping influencing attribute 216 in an embodiment may map a plurality of other influencing attributes to the hour or day of their occurrence or adjustment. In an embodiment, an attribute profiles 218 influencing attribute may operate to dynamically manage each of the other influencing attributes. For example, one attribute profile 218 may operate to dynamically manage operational battery dictated by the power profile influencing attribute 208. In an embodiment, a threat profile influencing attribute 220 may identify timing and results of routinely executed computer hard drive security scans. A location mapping 222 influencing attribute in an embodiment may describe a history of location measurements over a period of time that may be used to establish a user's daily, weekly, or monthly routine with respect to travel within a house, building, neighborhood, town, city, state, country, or across countries, or with respect to one or more wireless networks.

Yet further examples of influencing attributes for an information handling system or subcomponents thereof may include management profiles 224, configuration adjustment profiles 226, and default setting delta profiles 228. A management profile 224 influencing attribute in an embodiment may describe details of a downloaded and installed computer configuration profile or system update. In an embodiment, a configuration adjustments influencing attribute 226 may identify each instance of adjustments made to the configuration of the information handling system, including adjustments to display functionality (e.g. adding or removing new display devices either wired or wirelessly), manipulation of the information handling system from a laptop configuration to a tablet configuration, configuring the information handling system as a node within a mesh network, moving the information handling system from a high wakefulness state to a less wakeful or hibernating state, displaying images at a higher or lower resolution, enabling or disabling one or more types of wireless communication, enabling or disabling remote access to the information handling system by IT professionals, addition or removal of authorized users, or any other adjustment that made by made to the configuration of one or more systems within the information handling system. A default setting deltas influencing attribute 228 in an embodiment may identify adjustments made to default settings for an information handling system set upon manufacture, or set by an IT professional, as well as the time at which such adjustment was made.

Influencing attributes 200 may have a measurable value within a range of possible values in some embodiments. For example, a network profile influencing attribute 214 may provide RSSI having a value between zero and one hundred for a particular communication link established by the network interface device. As another example, a location mapping influencing attribute 222 may include GPS coordinates of the information handling system, or may measure distance in meters between the information handling system and known network gateways, base stations, access points, or mesh network nodes. In other aspects of an embodiment, some influencing attributes 200 may have binary values reflecting either an "on" or "off" state. Further, each of these attributes may also be interrelated with one or more other influencing attributes. For example, a network profile influencing attribute 214 (e.g. RSSI value) may be interrelated with a location mapping influencing attribute 222 (e.g. distance from a known network base station). The influencing attributes 200 in an embodiment may thus provide highly granular information about the performance of an information handling system or a subcomponent thereof.

Figure 3:
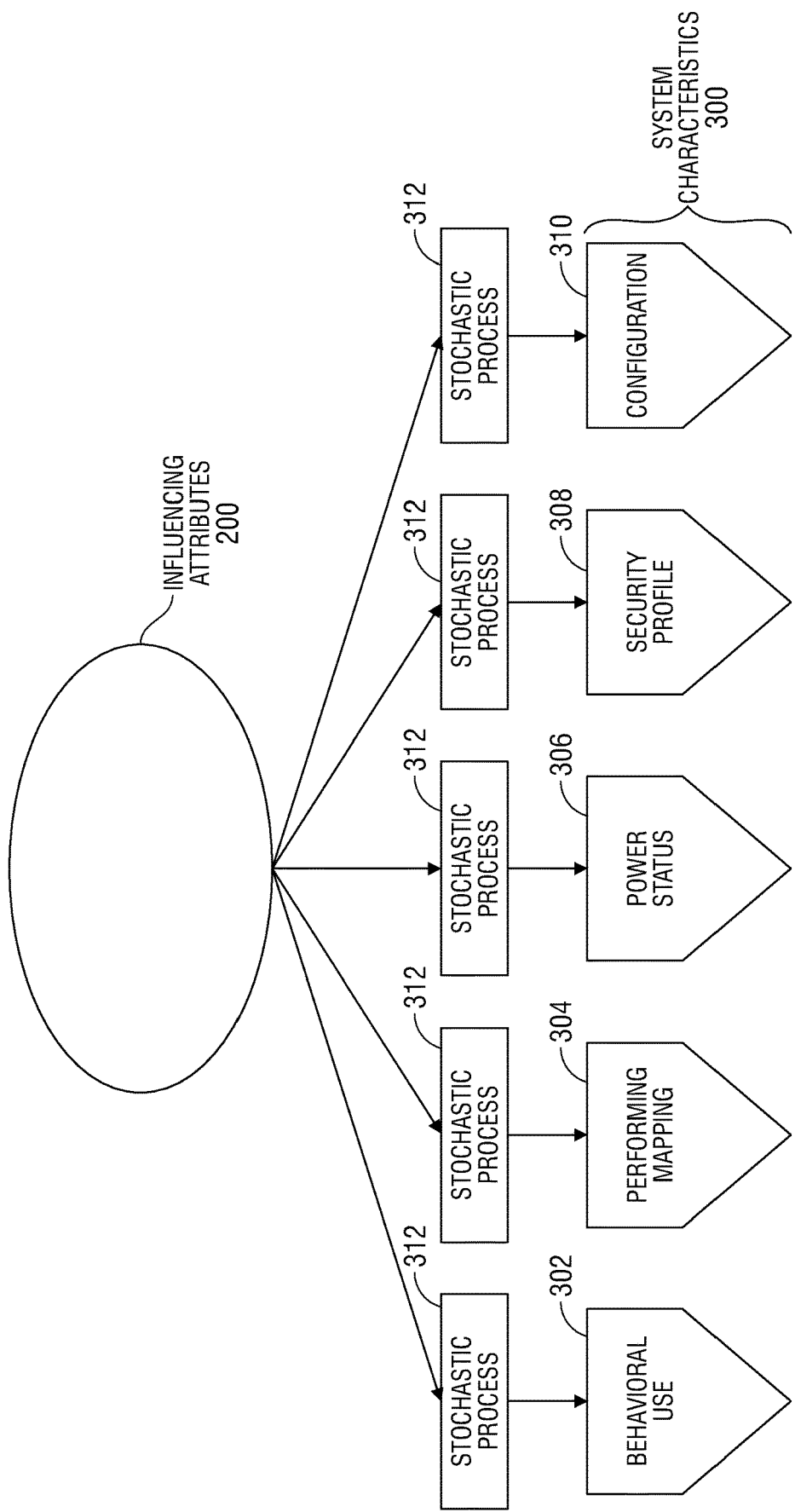
FIG. 3 is a block diagram illustrating a plurality of system characteristics according to an embodiment of the present disclosure.

FIG. 3 is a block diagram illustrating interrelation between a plurality of influencing attributes and a plurality of system characteristics via stochastic processes according to an embodiment of the present disclosure. Adjustments made to the functional performance of the information handling system in response to predicted changes in performance may be made at a higher-level than the granular influencing attributes 200. For example, adjustments may be made to higher-level system characteristics 300. System characteristics 300 may include, for example, behavior use characteristics 302, performance mapping characteristics 304, power status characteristics 306, security profile characteristics 308, and configuration characteristics 310. Each of the system characteristics 300 may be described by a plurality of performance metrics, and the association between each system characteristic 300 and its defining plurality of performance metrics may be stored in a memory in an embodiment. Each of the plurality of performance metrics in an embodiment that define a system characteristic 300 may be an influencing attribute, or may describe a combination of several influencing attributes 200. In another aspect, performance metrics that define one system characteristic may include states or values of other system characteristics.

The behavioral use system characteristic 302 in an embodiment may describe and/or dictate the locations and/or times of day/week the information handling system is likely to be used, and in what way. For example, the behavioral use system characteristic 302 may identify times and/or locations of the information handling system indicating the user is at home, at work, or travelling between the two. Being able to differentiate between these two states may assist in predicting future communication, power, and performance requirements. In such an embodiment, the behavioral use 302 system characteristic may be defined, in part, based on performance metrics including the location of the information handling system at a given time. In another example, a behavioral use 302 system characteristic may measure user behavior over time. For example, in an embodiment in which the information handling system moves to a sleep, hibernation, locked, or dimmed state after a preset time period, and the user consistently moves the information handling system from that state to a waking or brightened state immediately thereafter, the behavioral use 302 system characteristic may associate that user with a need to extend the period of idle time needed before the information handling system moves into the sleep, hibernation, locked, or dimmed state.

In other aspects, the behavioral use characteristic 302 may identify the type of activity the user engages in at certain times, and a measure of one or more performance resources needed to complete such tasks. For example, the behavioral use system characteristic 302 may differentiate between a first user that primarily uses the information handling system for streaming and viewing video content, requiring high performance internet connectivity, graphics processing, and display capabilities, and a second user that primarily uses the information handling system for writing and compiling computer code instructions, requiring comparably lower performance internet connectivity, graphics processing, and display capabilities, but comparably much higher processing power. In such an embodiment, the behavioral user 302 system characteristic may be defined, in part, based on performance metrics including which applications the user is running at a given time, and an identification of graphics/computing resources required for such uses.

In an embodiment, the performance mapping system characteristic 304 may determine to which applications or processes certain operational resources may be dedicated in order to optimize performance for the information handling system, as used by the current user. For example, the performance mapping system characteristic 304 may prioritize tasks for various computing components based on which activities the user is engaging in (e.g. as dictated by the behavioral use 302 system characteristic), how much power is expected to be available (e.g. as dictated by the power status 306 system characteristic), which activities are disallowed due to established policies (as dictated by the configuration 310 system characteristic) or due to security considerations (as dictated by the security profile 308 system characteristic). In such a way, performance metrics that define the performance mapping 304 system characteristic may include states or values of each of the other system characteristics 302, and 306-310.

The power status system characteristic 306 in an embodiment may describe and/or dictate the power consumed by one or more processes or sub-components of the information handling system, as well as power expected to be available at a given time. An example adjustment to such a power status 306 may include, for example, decreasing the amount of power consumed by the video display of an information handling system by decreasing the intensity at which light is emitted or by moving the video display from an always on state to a state in which the screen hibernates after two minutes of inactivity.

In an embodiment, the security profile 308 system characteristic may determine requirements for accessing the information handling system. Example requirements may include satisfying a retinal scan, fingerprint scan, voice scan, face recognition scan, passcode or a combination of these or any other known security feature. In other words, the security profile system characteristic 308 in an embodiment may dictate whether a peripheral or integrated fingerprint scanner, microphone, or camera capable of performing identification via any of these methods may remain in an active or hibernating state, or may engage automatically upon detection of a nearby user. In other embodiments, the security profile 308 system characteristic may determine based on measured location of the information handling system, or via ambient noise measured via the microphone that the user is in a public place, and initiate a secure viewing session in which the user may view non-secure information via the video display viewable by members of the public, and may view secure information only via a wearable headset display device to form an augmented reality. In other embodiments, the security profile 308 system characteristic may describe whether a secondary BIOS-level security passcode is required, or whether a secondary geographic location based security protocol is established, allowing the user to only gain access when the information handling system is at a pre-specified location. In yet other embodiments, the security profile 308 system characteristic may dictate which applications or processes may communicate via the network interface device with remote networks, and which applications may be sandboxed for security reasons.

The configuration system characteristic 310 in an embodiment may describe the information handling system's software configuration, BIOS configuration, physical/hardware configuration, or configuration with respect to larger enterprise networks, for example. Physical configurations may describe the information handling system's interaction with one or more peripheral devices, such as multiple monitors, a virtual reality headset, an augmented reality headset, an electromagnetic resonance pen or stylus, Bluetooth microphones, wired and/or wireless printers, and/or Internet of Things (IoT) wireless sensors or devices. Other configurations dictated by the configuration system characteristic 310 may include configuring the operating system or applications running thereon according to preset rules associated with a student, guest, client, employee, or administrator within an enterprise network. Still other examples of configuration system characteristics 310 may describe settings within policies (e.g. within software or firmware), where each possible policy setting is preset and known.

Each of the system characteristics 300 may have a predetermined and known range of settings or values, and each such setting or value may dictate a specific combination of performance configurations. For example, the power status 306 system characteristic may include several settings along a spectrum from a low power to a full power setting. In such an example embodiment, a setting closer to the low power side of the spectrum may dictate a combination of performance configurations, including disallowing push notifications, disabling Bluetooth connectivity, and disallowing certain applications to run in the background or access processing resources. Each of these possible settings may be preset and stored in a memory in an embodiment.

In embodiments of the present disclosure, each of the system characteristics 300 may be measured directly at a given time by determining which of the possible states in which each of the system characteristics may be placed. For example, the power status system characteristic may measure the amount of power received and consumed by each subcomponent (e.g. the video display) of the information handling system, and/or may determine whether the information handling system is currently plugged into a wall outlet or is operating on battery power alone. As another example, the performance mapping system characteristic 304 may be set to prohibit all push notifications. Similarly, it may be determined whether the behavioral use system characteristic 302 is set to a home, work, or travel mode, whether the security profile system characteristic 308 requires retinal scans, voice recognition, and/or facial recognition for access, and whether the configuration system characteristic 310 is set to integrate with a peripheral device such as a Bluetooth microphone.

The sensor fusion prediction based automatic adjustment system may in an embodiment may anticipate an event likely to trigger a needed change in a system characteristic 300 before it occurs using an iterative predictive algorithm, and make the adjustment automatically, prior to the occurrence of such an event. In order to increase accuracy of the iterative predictive algorithm, the sensor fusion prediction based automatic adjustment system may base its prediction of future system characteristic states on the plurality of influencing attribute data 200, which is more granular than the measurements of the system characteristics 300. The sensor fusion prediction based automatic adjustment system in embodiments of the present disclosure may employ a stochastic process/statistical inference algorithm 312 to the influencing attributes in order to identify which of the influencing attributes affects each of the system characteristics and how.

The sensor fusion prediction based automatic adjustment system in an embodiment may normalize the values of each of the influencing attributes and each of the system characteristics through a stochastic process 312, such that deleterious effects of conflicting units between each of these metrics on such a prediction may be avoided. Such a stochastic method may normalize each value by dividing it by the potential range of values it may take in any given scenario. For example, if the network base station has a known range of one kilometer, and the location mapping influencing attribute describes a distance of 100 meters from the base station, the sensor fusion prediction based automatic adjustment system may normalize the value of the location mapping influencing attribute to have a value of ten out of a possible one hundred (e.g. 100 meters divided by one kilometer). A stochastic method may be similarly applied to all other influencing attributes in order to give them a value between zero and one hundred, indicating the percentage of the measured value with respect to the range of possible values. Further, a stochastic method may be similarly applied to all system characteristics to give them a value between zero and one hundred. Further, each of the possible states of each of the system characteristics 300 may be normalized to a value between zero and one hundred. For example, if the behavioral use 302 system characteristic is capable of functioning in a home state, working state, and travel state, each of these values may be normalized to values of zero, fifty, and one hundred, respectively.

Once each of the influencing attributes and each of the system characteristics are normalized, the sensor fusion prediction based automatic adjustment system may perform a statistical inference algorithm to determine the probability that any possible combinations of given influencing attributes 200 caused or significantly affected a measured system characteristic 300. If the probability for a given combination meets a preset inference threshold, the sensor fusion prediction based automatic adjustment system in an embodiment may associate each of the influencing attributes 200 in that combination to that specific system characteristic 300. Further, the sensor fusion prediction based automatic adjustment system in embodiments may perform such statistical inference algorithms repeatedly over a learning period of time in order to determine which states (values) of a combination of influencing attributes 200 are most likely to cause a given state (value) of a system characteristic 300. In other words, the sensor fusion prediction based automatic adjustment system may learn under which circumstances, as described by values of a plurality of influencing attributes 200, a given system characteristic 300 may move from a first state to a second state. Examples of statistical inference algorithms in an embodiment may include Bayesian inference and Bayesian updating, as well as other known non-Bayesian inference methods (e.g. the Dutch Book approach).

Determination of which influencing attributes affect the settings/measurements/values of a given system characteristic 300 may be implemented with a machine learning system in other embodiments. As described herein, each influencing attribute may have a measurable value (e.g. on a normalized scale or spectrum of possible settings), or may have a binary value indicating an "on" or "off" state. In other aspects, iterative weighting may be applied to the various influencing attributes 200 to train an artificial neural network or decision tree such that some influencing attributes 200 will be deemed to have greater importance in affecting the measured outcome of one or more system characteristics 300.

The sensor fusion prediction based automatic adjustment system may apply one or more applications of machine learning algorithms to map one or more influencing attributes 200 described herein to an output setting or value of one or more system characteristics 300 via a learned target function. For example, predictive analytics may be employed to associate a power status 306 system characteristic with influencing attributes 200 including network profile, application profile, power profile, historical performance, feature/capability.

It will be understood that the influencing attributes may often include one or more other system characteristics that may be treated as individual input variables for the machine learning algorithm's determination of the value/setting for another system characteristic. In one example embodiment, a binary classification determination may need to be made between two possible states of an influencing attribute or system characteristic. Any machine learning algorithm suitable for binary classification analysis may be used in such an example embodiment. Example machine learning algorithms used for such an analysis may include logistic regression techniques, linear discriminant analysis, linear regression analysis, artificial neural networks, or classification/regression trees in some embodiments. In an example embodiment, machine learning classifier algorithms may be employed to determine a classification of an influencing attribute as affecting the outcome of a given system characteristic.

In various other embodiments, machine learning systems may employ Naïve Bayes predictive modeling analysis of several varieties, learning vector quantization artificial neural network algorithms, or implementation of boosting algorithms such as Adaboost or stochastic gradient boosting systems for iteratively updating weighting to train a machine learning classifier to determine a relationship between an influencing attribute and a system characteristic and/or a degree to which such an influencing attribute affects the outcome of such a system characteristic. Several of these latter algorithms may establish a model with training data for utilization by the sensor fusion prediction based automatic adjustment system. Boosting may be used with decision trees in one aspect whereas learning vector quantization may be used with artificial neural network algorithms. There are a variety of machine learning paradigms available for classification prediction with a plurality of variables such as those described in the embodiments of the sensor fusion prediction based automatic adjustment system herein.

The stochastic process 312 in an embodiment may further predict future states of one or more influencing attributes 200, based on measured, recorded, and/or normalized values of the influencing attributes 200 over the learning time period. In such an embodiment, a closed-loop, iterative process may be used to determine a future value of an influencing attribute 200 based on previous states of the same influencing attribute. For example, a Kalman filter may be used to make such a determination in an embodiment. As another example, a neural network or machine learning algorithm employing a gradient-descent method may be used to make such a prediction of a future state.

Figure 4:
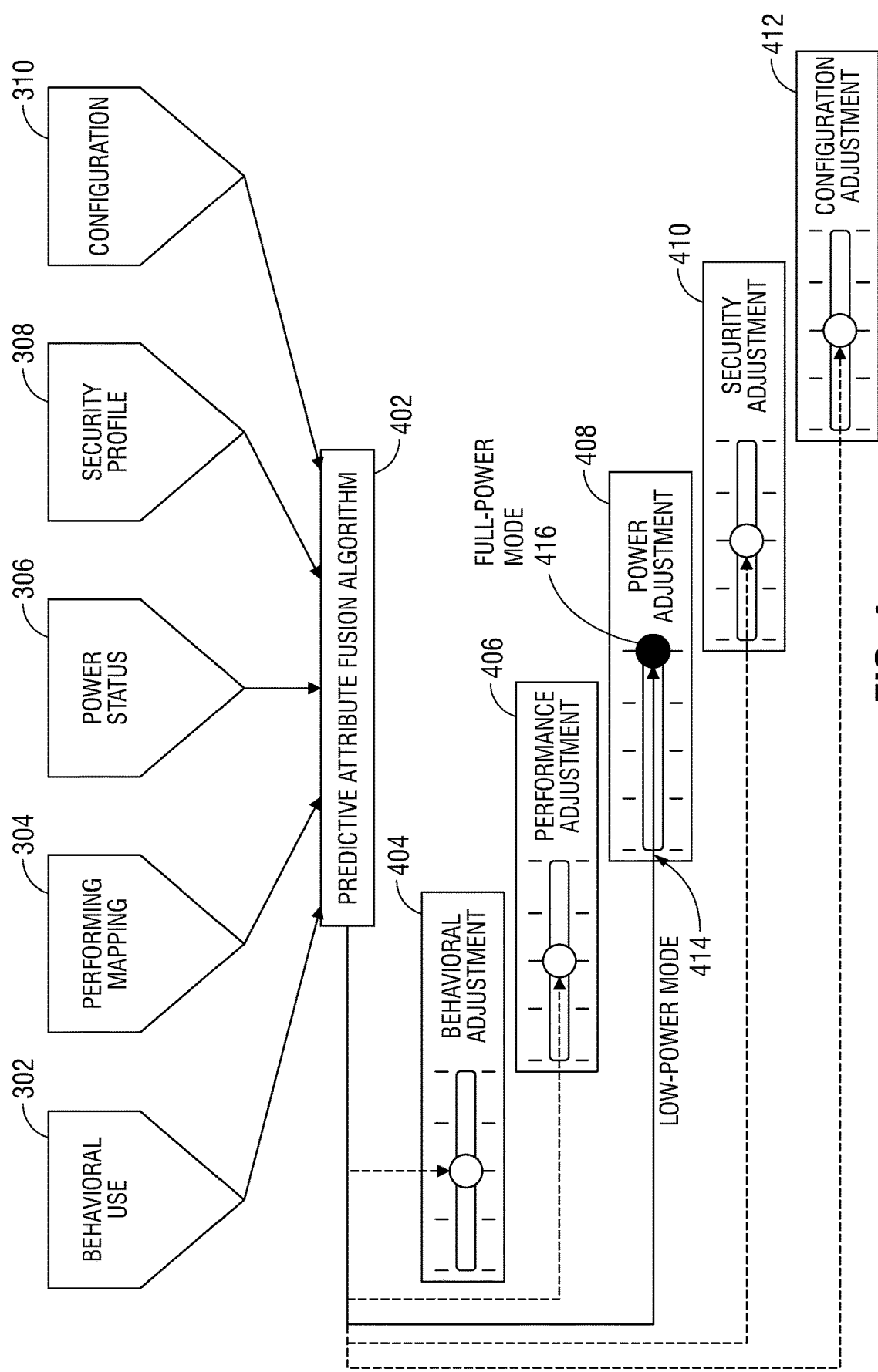
FIG. 4 is a block diagram illustrating an adjustment of a system characteristic according to an embodiment of the present disclosure.

FIG. 4 is a block diagram illustrating an adjustment of a system characteristic based on a predictive attribute fusion algorithm according to an embodiment of the present disclosure. The sensor fusion prediction based automatic adjustment system in an embodiment may use a sensor fusion algorithm 402 to determine, based on future states determined by the stochastic process of one or more influencing attributes known to affect one or more system characteristics 302-310, whether current adjustable settings are optimized for each of the predicted future system characteristic states.

Each of the system characteristics 302-310 may have a plurality of possible settings, as illustrated in the adjustment interfaces 404-412 shown in FIG. 4. For example, the behavioral use system characteristic 302 may include a plurality of possible adjustable behavioral settings 404, between a first known state indicating the user is browsing the internet, requiring very few computing resources, to a second known state indicating the user is streaming ultra-high definition video, requiring more processing capabilities and a very fast internet connection. As another example, the performance mapping system characteristic 304 may include a plurality of adjustable performance settings 406, between a first known state allowing high-definition graphics applications to consume as much processing power as needed, to a second known state capping processing power accessible by such programs, capping the amount of processing power accessed by the network interface device, closing background applications, or disallowing push notifications from idle applications. As yet another example, the power status system characteristic 306 may include a plurality of possible adjustable power settings 408, between a first known low-power mode 414 in which the network interface device and/or one or more radio access technologies (e.g. Bluetooth) are turned off to conserve power to a second known full-power mode 416 in which such activities may be allowed. The security profile system characteristic 308 may include a plurality of possible adjustable security settings 410, between a first known state in which only a passcode is required to gain access to the information handling system to a second known state in which facial recognition, voice recognition, a fingerprint scan, or a retinal scan are also required in order to gain access. As yet another example, the configuration system characteristic 310 may include a plurality of possible adjustable configuration settings 412, between a first state in which the information handling system is configured to detect nearby Bluetooth microphones and automatically connect thereto to a second state in which the information handling system is configured to operably connect instead to a head-mounted display device for use in an augmented reality user interface.

Each of the possible settings within for a given system characteristic may be associated with a different combination of policies, settings (e.g. hardware, software, firmware, component), or configurations dictating performance of the information handling system. For example, a low-power mode setting 414 may be associated with a connectivity policy prohibiting Bluetooth connectivity, an application policy prohibiting idle applications to access processing resources, display policies capping the illumination of pixels within the display to conserve energy, and/or notification policies disallowing push notifications. The association between each possible setting between the low-power mode 414 and the full-power mode 416 and each policy, setting, or configuration affected by that setting may be preset and stored in a memory in an embodiment.

The predictive attribute fusion algorithm 402 in an embodiment may determine a future state for each of the system characteristics 302-210 based on the predicted future states of each of the influencing attribute, and based on the known relationships between each system characteristic and each influencing attribute and/or other system characteristics. For example, the sensor fusion prediction based automatic adjustment system in an embodiment may have determined via the statistical inference algorithm that a given state of the power status system characteristic 306 will occur at a given combination of metric measurements of the power profiles, historical performance, functionality profile, location mapping, network profile, configuration adjustments, and application profile influencing attributes. In such an example, the sensor fusion algorithm 402 may combine the predicted future states of each of these influencing attributes in order to determine whether the combination of the predicted future states of those influencing attributes will likely cause a change in the state of the power status system characteristic 306. In such a way, the sensor fusion prediction based automatic adjustment system in embodiment of the present disclosure may predict a needed change in one or more information handling system characteristics 302-310, prior to such a need arising. By analyzing future states for each of the plurality of influencing attributes using a fusion algorithm, the predictive attribute fusion algorithm may determine future states of each of the system characteristics with a greater degree of certainty than methods of determining the future state of only one system characteristic at a time. This may be due to the interrelated nature of each of the system characteristics 302-310 in an embodiment.

Once such a future need has been identified in embodiments of the present disclosure, the sensor fusion prediction based automatic adjustment system may determine whether the current settings associated with that system characteristic allow for such a change. For example, a current state of the power status 306 may indicate the information handling system is operating on battery power, and is set to the low-power mode 414. In such an example embodiment, the future state of the power status 306 system characteristic determined by the predictive attribute fusion algorithm 402 may indicate the information handling system is likely to be plugged into a continuous power source, and that the activities the user will engage in at that time will consume a high level of processing resources, and thus, power. In such a scenario, the sensor fusion prediction based automatic adjustment system may determine the current low-power mode 414 setting does not allow the processor to consume the high level of processing resources and power the user is anticipated to need at that time. Such a high power need and access to a continuous power source in an embodiment may be associated with the full-power mode 416, rather than the low-power mode 414. In one embodiment, the sensor fusion prediction based automatic adjustment system may automatically adjust the setting associated with the power status 306 system characteristic to the full-power mode 416 that does allow the processor to consume the high level of processing resources and power the user is anticipated to need at that time, based on the anticipated needs, and based on anticipation that the information handling system will be plugged into a continuous power supply at that time.

In another embodiment, the predictive attribute fusion algorithm may optimize settings for a plurality of system characteristics prior to performing any automatic adjustments to any one system characteristic settings. For example, in an embodiment in which the settings for more than one system characteristic may need to be altered in order to accommodate predicted future states for those system characteristics, the predictive attribute fusion algorithm may ensure such settings adjustments do not conflict with one another, and mitigate deleterious effects if this is the case. For example, if a future state of the behavioral use 302 system characteristic indicates the user will likely begin streaming ultra-high definition (UHD) video, the predictive attribute fusion algorithm 402 may determine the behavioral use 302 system characteristic setting may need to be changed to allow such activity. However, if the future state of the power status 306 system characteristic indicates the information handling system will likely be operating solely on battery power, the predictive attribute fusion algorithm may determine the power status 306 setting may need to be adjusted to disallow this same activity (e.g. streaming ultra-high definition video).

In such an embodiment, the predictive attribute fusion algorithm may analyze all possible settings of each of the system characteristics 302-310 in order to identify an optimal combination of all of the system characteristics' settings likely to meet the predicted future needs. The predictive attribute fusion algorithm in such an embodiment may, for example, modify settings of other system characteristics (e.g. 304, 308-310) in order to conserve battery power enough that streaming UHD video will not deleteriously affect system performance. For example, the predictive attribute fusion algorithm 402 may determine the future state of the security profile 308 system characteristic does not dictate a need for a retinal scanner to access the information handling system, and set the security adjustment 410 to a lower security setting that does not require retinal scanning. By avoiding the use of such a retinal scanner, the power used for retinal scanning may instead be diverted toward the higher priority activity of streaming UHD video. The predictive attribute fusion algorithm in such an embodiment may then automatically adjust the settings of each of the affected system characteristics in order to optimize performance across all system characteristics.

In such a way, the sensor fusion prediction based automatic adjustment system may adjust the functionality of the information handling system without the user experiencing inefficient or poor performance, and without the user having to manually change any settings of the system. The sensor fusion prediction based automatic adjustment system in an embodiment may thus anticipate such a needed system characteristic adjustment prior to such a need arising, and automatically perform such an adjustment, providing seamlessly optimized performance of the information handling system.

Figure 5:
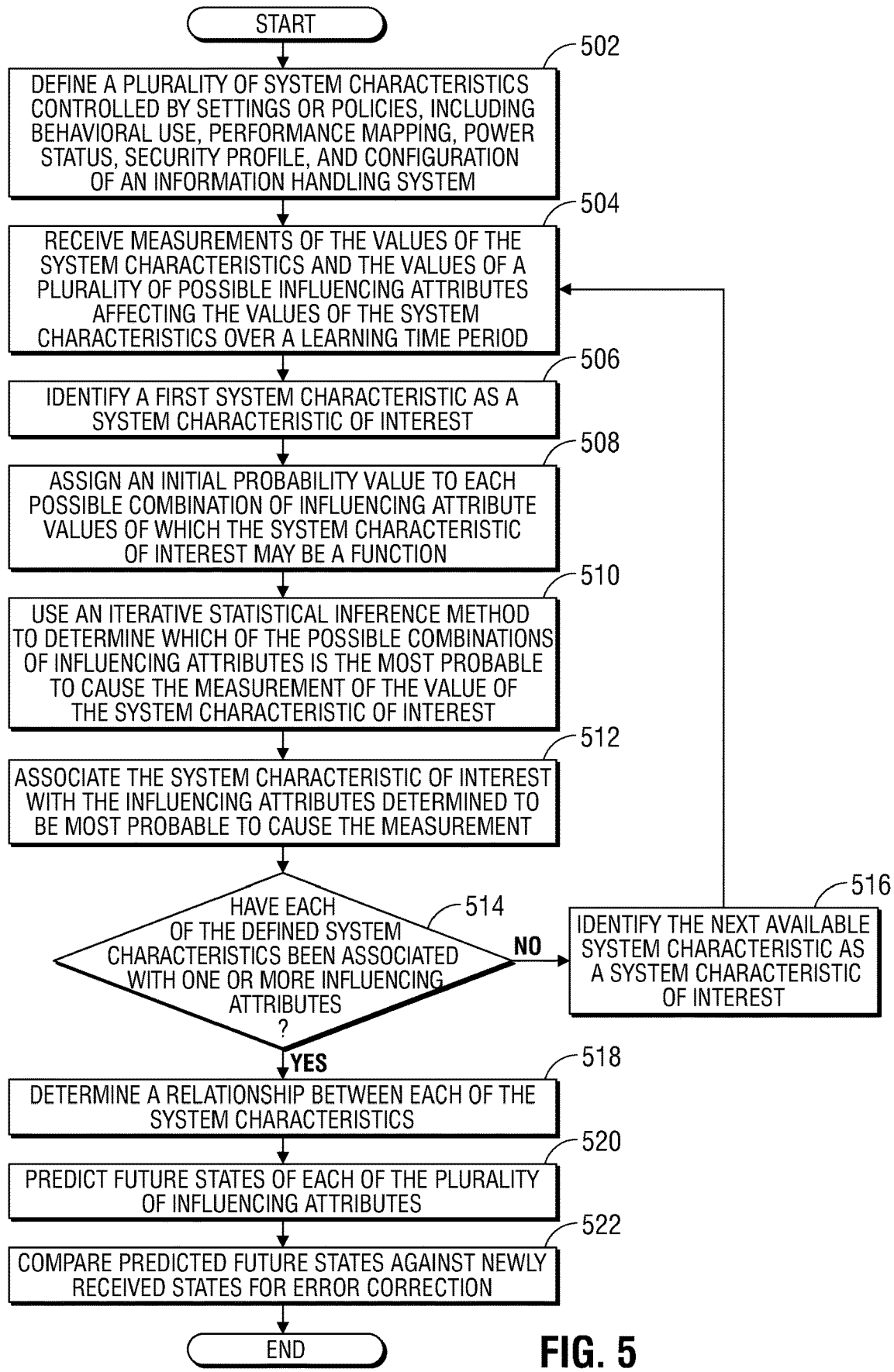
FIG. 5 is a flow diagram illustrating a method of associating one or more influencing attributes with a system characteristic according to an embodiment of the present disclosure.

FIG. 5 is a flow diagram illustrating a method of associating one or more influencing attributes with a system characteristic using a statistical inference algorithm according to an embodiment of the present disclosure. The sensor fusion prediction based automatic adjustment system in an embodiment may make such an association in order to predict a future state of a system characteristic based on predicted states of the one or more influencing attributes known to affect such a system characteristic.

At block 502, the sensor fusion prediction based automatic adjustment system in an embodiment may define a plurality of system characteristics controlled by settings or policies, including behavioral use, performance mapping, power status, security profile, and configuration of an information handling system. For example, in an embodiment described with reference to FIG. 4, each of the system characteristics 302-310 may have a plurality of possible settings, as illustrated in the adjustment interfaces 404-412. The relationship between each possible setting illustrated in the adjustment interfaces 404-412 may be associated in a memory with one or more policy settings in an embodiment. Each of these policies in an embodiment may dictate actions allowable by the information handling system adhering to such policies. For example, a low-power mode setting 414 may be associated with a connectivity policy prohibiting Bluetooth connectivity, an application policy prohibiting idle applications to access processing resources, display policies capping the illumination of pixels within the display to conserve energy, and/or notification policies disallowing push notifications.

At block 504, in an embodiment, the sensor fusion prediction based automatic adjustment system may receive measurements of the values of influencing attributes and/or system characteristics. Influencing attributes in an embodiment may include granular performance metrics influencing the states of one or more system characteristics. For example, in an embodiment described with reference to FIG. 2, the sensor fusion prediction based automatic adjustment system may receive measurements or metrics of each of the influencing attributes 200, and may store measurements for each of the individual influencing attributes 200 in a separate index or table in a memory of the information handling system. Each measurement in such an index or table may be associated with a date and time at which each measurement was made in an embodiment. Such measurements may be made during an initial learning time period in which the information handling system is passively recording such metrics or measurements, or may be made during an adjustment period in which the information handling system is adaptively and automatically adjusting one or more system characteristics based on the states of the influencing attributes recorded during the learning time period.

In some embodiments, the sensor fusion prediction based automatic adjustment system may operate onboard the information handling system where each of the influencing attributes is measured. For example, the sensor fusion prediction based automatic adjustment system may operate onboard a laptop computer at which each of the influencing attributes is measured, and the system characteristics of which the sensor fusion prediction based automatic adjustment system may automatically adjust. In other embodiments, the sensor fusion prediction based automatic adjustment system may operate remotely from the information handling system where each of the influencing attributes is measured. For example, the sensor fusion prediction based automatic adjustment system may operate at a centrally located remote server to receive measurements of each of the influencing attributes from the laptop at which the measurements are being made, and may store those measured influencing attributes in a plurality of indices or tables at a memory of the remotely located central server at block 502.

Each of the system characteristics in an embodiment may be measured directly at a given time by determining which of the possible states in which each of the system characteristics may be placed. For example, the power status system characteristic 306 may identify whether the information handling system is currently plugged into a wall outlet (e.g. placed in default full-power mode) or is operating on battery power alone such that the information handling system is placed in the intermediate or low-power modes. As another example, the performance mapping system characteristic 304 may be set to prohibit all push notifications. Similarly, it may be determined whether the behavioral use system characteristic 302 is set to a home, work, or travel mode, whether the security profile system characteristic 308 requires retinal scans, voice recognition, and/or facial recognition for access, and whether the configuration system characteristic 310 is set to integrate with a peripheral device such as a Bluetooth microphone. The states for each of the system characteristics 300 may be measured at routine intervals during the training time period, and each of those measurements may be stored on a memory of the information handling system described by such system characteristics 300.

Each of the system characteristics 300 in an embodiment may be a function of one or more influencing attributes 200. In other words, one or more influencing attributes may affect the value or state of each of the system characteristics, although such a relationship may be unknown. For example, metrics describing the ways in which power is being consumed, and which components or processes are consuming more or less power than others, as described by the power status system characteristic 306 may be influenced by factors reflected in metric measurements from the power profiles, historical performance, functionality profile, location mapping, network profile, configuration adjustments, and application profile influencing attributes. However, the identity of each influencing attribute affecting such power status system characteristic 306 measurements, and the ways in which each influencing attribute affects such measurements may not be known in an embodiment.

At block 506, the sensor fusion prediction based automatic adjustment system in an embodiment may identify a first system characteristic as a system characteristic of interest. For example, in an embodiment described with reference to FIG. 3, the sensor fusion prediction based automatic adjustment system may identify the behavioral use system characteristic 302 as a system characteristic of interest. As another example of the same embodiment, the sensor fusion prediction based automatic adjustment system may identify the security profile system characteristic 308 as the system characteristic of interest. As yet another example of the same embodiment, the sensor fusion prediction based automatic adjustment system may identify the power status system characteristic 306 as the system characteristic of interest.

At block 508, the sensor fusion prediction based automatic adjustment system in an embodiment may assign an initial probability value to each possible combination of influencing attributes of which the system characteristic of interest may be a function. Such an initial probability value assignment in an embodiment may be the first step in an iterative statistical inference method used to determine which influencing attributes affect the system characteristic of interest. Because the identity of the influencing attributes that affect the outcome of the system characteristic of interest is not known, the sensor fusion prediction based automatic adjustment system in such an embodiment may perform this initial step for each of the influencing attributes whose metrics are measured during the learning time period. For a given combination of influencing attributes and a given system characteristic in an embodiment, this initial probability value may be determined based on an analysis of the values of the given combination of influencing attributes and of the given system characteristic taken at a single instance in time. In other words, the initial probability value may be assigned based on only one state of each of the given combination of influencing attributes and the given system characteristic.

The sensor fusion prediction based automatic adjustment system in an embodiment may use an iterative statistical inference method in an embodiment to determine which of the possible combinations of influencing attributes is the most probable to cause the measurement of the value of the system characteristic of interest at block 512. A statistical inference algorithm may determine the probability that an event was conditional on a combination of antecedent events. More specifically, a statistical inference algorithm of the sensor fusion prediction based automatic adjustment system may determine the probability that any possible combination of given influencing attributes 200 caused or significantly affected a measured system characteristic 300.

Examples of statistical inference algorithms in an embodiment may include Bayesian inference and Bayesian updating, as well as other known non-Bayesian inference methods (e.g. the Dutch Book approach). For example, in an embodiment in which the iterative statistical inference method used is a Bayesian updating method, each iteration of the method may deal with influencing attribute data gathered up until a different point in time. In other words, a first iteration of the Bayesian updating method may consider the initial probability determined in block 512 based on a single state of each of the influencing attributes and the system characteristic of interest at the first point in time at which the recordation of each of those values were made. The second iteration in such an embodiment may consider a probability based on those single states, plus a second state for each of those influencing attributes and system characteristic of interest at a second point in time (e.g. one second later than the first point in time). At each iteration, a marginal likelihood that the influencing attributes under consideration caused the measured system characteristic value to occur is calculated. As more iterations are performed, the difference between the marginal likelihood at the current iteration and the marginal likelihood at the previous iteration may decrease. In other words, the marginal likelihood value in an embodiment may converge as the number of iterations increases.

If the marginal likelihood converges toward a minimum convergence threshold, the sensor fusion prediction based automatic adjustment system in an embodiment may associate each of the influencing attributes in that combination to that specific system characteristic. The minimum convergence threshold in an embodiment may be preset prior to the training time period, and may be, for example, two percent. In other words, in such an embodiment, further iterations may be employed until the marginal likelihood from the current iteration differs from the marginal likelihood of the previous iteration by only two percent. In other embodiments, the minimum convergence threshold may be equivalent to one tenth, one, or five percent, for example. If the marginal likelihood has not yet converged toward the minimum convergence threshold, the sensor fusion prediction based automatic adjustment system in an embodiment may move to a next iteration of the iterative statistical inference method by analyzing a later state of each of the given combination of influencing attributes and the given system characteristic. The number of iterations required to meet the minimum convergence threshold may dictate the length of the training time period in some embodiments. In other words, the training time period may end when the marginal likelihood has converged toward the minimum convergence threshold in some embodiments.

Further, the sensor fusion prediction based automatic adjustment system in embodiments may perform such statistical inference algorithms repeatedly over a learning period of time in order to determine which states (values) of a combination of influencing attributes 200 are most likely to cause a given state (value) of a system characteristic 300. In other words, the sensor fusion prediction based automatic adjustment system may learn under which circumstances, as described by values of a plurality of influencing attributes 200, a given system characteristic 300 may move from a first state to a second state.

Determination of which influencing attributes affect the settings/measurements/values of a given system characteristic 300 may be implemented with a machine learning system in other embodiments. The sensor fusion prediction based automatic adjustment system may apply one or more applications of machine learning algorithms to map one or more influencing attributes 200 described herein to an output setting or value of one or more system characteristics 300 via a learned target function. For example, predictive analytics may be employed to associate a power status 306 system characteristic with influencing attributes 200 including network profile, application profile, power profile, historical performance, feature/capability.

Example machine learning algorithms used for such an analysis may include logistic regression techniques, linear discriminant analysis, linear regression analysis, artificial neural networks, machine learning classifier algorithms, or classification/regression trees in some embodiments. In various other embodiments, machine learning systems may employ Naïve Bayes predictive modeling analysis of several varieties, learning vector quantization artificial neural network algorithms, or implementation of boosting algorithms such as Adaboost or stochastic gradient boosting systems for iteratively updating weighting to train a machine learning classifier to determine a relationship between an influencing attribute and a system characteristic and/or a degree to which such an influencing attribute affects the outcome of such a system characteristic.

At block 512, the sensor fusion prediction based automatic adjustment system in an embodiment may associate the system characteristic of interest with the influencing attributes determined to be most probable to cause the measured value of the system characteristic of interest to occur. For example, in an embodiment described with reference to FIG. 3 in which the power status system characteristic 306 is the system characteristic of interest, the power status system characteristic 306 may be associated with the power profiles, historical performance, functionality profile, location mapping, network profile, configuration adjustments, and application profile influencing attributes. In some embodiments, the iterative statistical inference method may further be used to determine the degree to which the values of the influencing attributes associated with the system characteristic of interest actually affect the measured value of the system characteristic of interest. For example, the sensor fusion prediction based automatic adjustment system in an embodiment may determine that the combination of the network profile, and location mapping influencing attributes may have a much stronger affect on the measured value of the power status system characteristic than do the power profiles, historical performance, functionality profile, configuration adjustments, and application profile influencing attributes.

The sensor fusion prediction based automatic adjustment system in an embodiment may determine whether each of the defined system characteristics has been associated with one or more influencing attributes at block 514. For example, in an embodiment in which the behavioral use system characteristic 302 is the system characteristic of interest, the remaining system characteristics 304-310 may yet to have been associated with any influencing attributes. If each of the defined system characteristics has not yet been associated with one or more influencing attributes, the method may proceed to block 516. If each of the defined system characteristics has been associated with one or more influencing attributes, the method may proceed to block 518.

At block 516, if it has been determined that each of the defined system characteristics has not yet been associated with one or more influencing attributes, the sensor fusion prediction based automatic adjustment system in an embodiment may identify the next available system characteristic as a system characteristic of interest. For example, in an embodiment in which the user behavior system characteristic 302 has been associated with one or more influencing attributes, the sensor fusion prediction based automatic adjustment system may identify the performance mapping system characteristic 304 as the system characteristic of interest. The method may then proceed back to block 504, and may loop through block 514. By executing the loop described by blocks 504 to block 514 in an embodiment, the sensor fusion prediction based automatic adjustment system may ensure that each of the defined system characteristics 300 are associated with one or more influencing attributes 200. Further, in some embodiments, by executing such a loop, the sensor fusion prediction based automatic adjustment system may determine the degree to which each of the influencing attributes associated with the system characteristics are likely to affect the measured value of those system characteristics. In such a way, the sensor fusion prediction based automatic adjustment system may identify ways in which each influencing attribute may affect each system characteristic in an embodiment.

At block 518, in an embodiment in which each of the defined system characteristics have been associated with one or more influencing attributes, a relationship between each of the system characteristics may also be determined. As described herein, each of the system characteristics may act as influencing attributes on other system characteristics. For example, the behavioral use system characteristic 302 may indicate the user is currently engaged in processor-intensive applications (e.g. rendering three-dimensional images), causing the power status system characteristic 306 to indicate a full-power mode that does not cap the amount of power consumed by the processor, thus allowing the processor to complete the processor-intensive task. The same iterative statistical inference method used to determine which of the possible combinations of influencing attributes is the most probable to cause the measurement of the value of the system characteristic of interest at block 510 may be used at block 518 to determine which system characteristics affect the value of other system characteristics, how, and/or to what degree. In other embodiments, the iterative statistical inference method used at block 518 may not be the same method used at block 510, but may be one of the methods described in possible embodiments of the method used at block 510.

The sensor fusion prediction based automatic adjustment system may predict future states of each of the plurality of influencing attributes in an embodiment at block 520. For example, in an embodiment described with reference to FIG. 3, the stochastic process 312 in an embodiment may further predict future states of one or more influencing attributes 200, based on measured, recorded, and/or normalized values of the influencing attributes 200 over the learning time period. In such an embodiment, a closed-loop, iterative process may be used to determine a future value of an influencing attribute 200 based on previous states of the same influencing attribute. For example, a Kalman filter may be used to make such a determination in an embodiment. As another example, a neural network or machine learning algorithm employing a gradient-descent method may be used to make such a prediction of a future state.

At block 522, the sensor fusion prediction based automatic adjustment system may compare predicted future states of one or more of the plurality of influencing attributes to new received measurements of the values of the influencing attributes for error correction. In an embodiment, the predicted future state of the one or more influencing attributes 200 may be compared against a new measured state of the one or more influencing attributes 200 at the time at which the predicted future state was predicted to occur. In such a way, the closed-loop, iterative process may also perform constant error correction for predicted future states. The method may then end.

Figure 6:
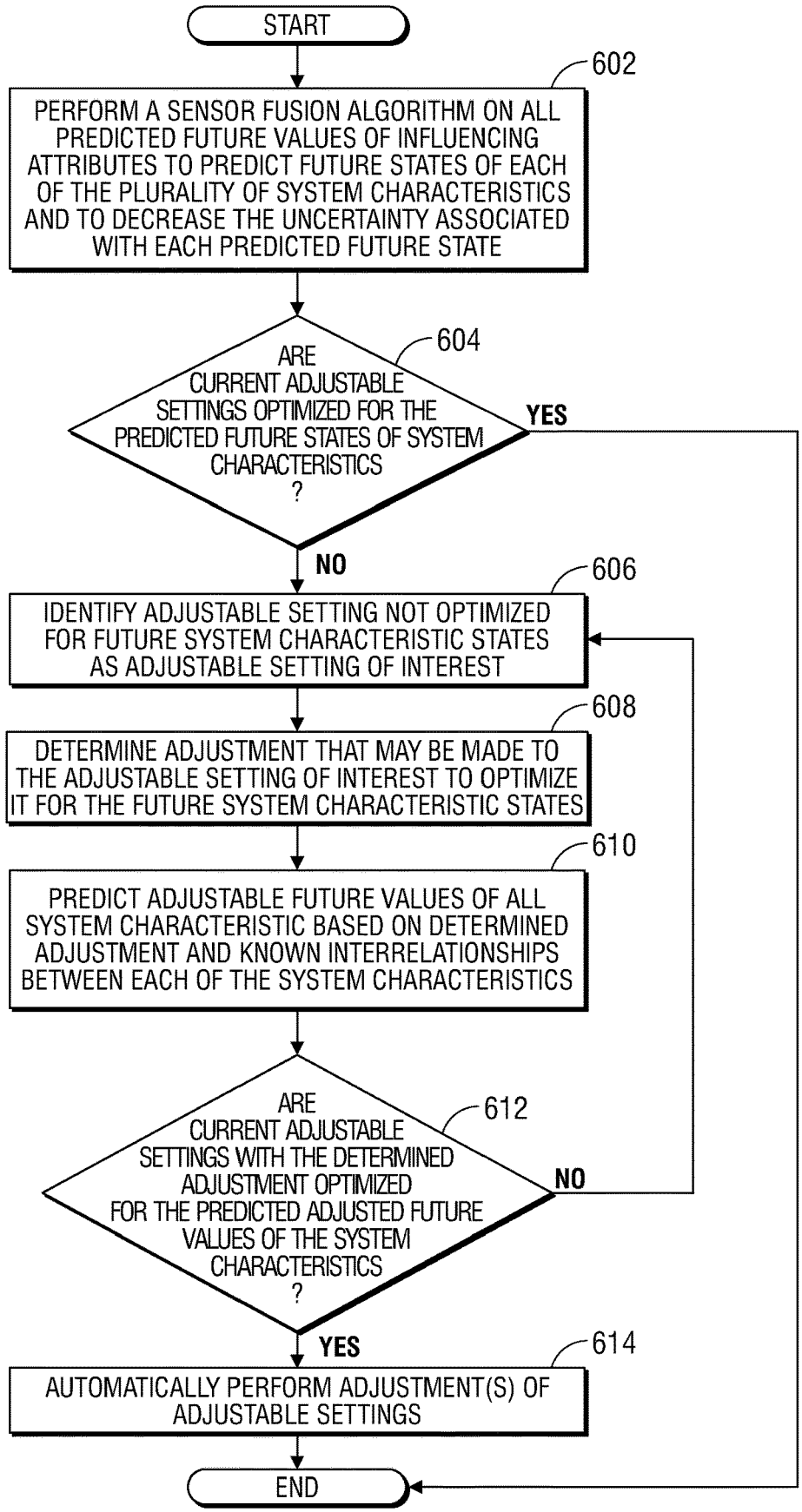
FIG. 6 is a flow diagram illustrating a method of automatically performing an adjustment according to an embodiment of the present disclosure.

FIG. 6 is a flow diagram illustrating a method of automatically performing an adjustment to allow for a system characteristic state that is predicted to occur using iterative prediction and sensor fusion algorithms according to an embodiment of the present disclosure. The sensor fusion prediction based automatic adjustment system in an embodiment may accurately predict changes in performance that may occur in the future by performing a sensor fusion algorithm on a plurality of future states of influencing attributes. In such a way, the sensor fusion prediction based automatic adjustment system in an embodiment may optimize functional performance of the information handling system automatically and seamlessly.

At block 602, the sensor fusion prediction based automatic adjustment system in an embodiment may perform a sensor fusion algorithm on all predicted future values of the influencing attributes to predict future states of each of the plurality of system characteristics and to decrease the uncertainty associated with each predicted future state. For example, the sensor fusion algorithm may be performed on all future values of influencing attributes predicted as part of the method described above in flowchart FIG. 5. A sensor fusion algorithm in embodiments of the present disclosure may combine data from disparate sources (e.g. each of the influencing attributes) such that the resulting information has less uncertainty than would be possible when these sources are used individually. For example, if the sensor fusion prediction based automatic adjustment system in an embodiment were to consider only the location mapping influencing attribute alone, it may not accurately gauge whether the power status system characteristic 306 is likely to be altered, because the location mapping influencing attribute alone does not describe the relation of the information handling system to the base station. Similarly, if the sensor fusion prediction based automatic adjustment system in an embodiment were to consider only the network profile influencing attribute alone, it may not accurately gauge whether the power status system characteristic 306 is likely to be altered, because the network profile influencing attribute alone does not describe whether the drop in signal quality detected is caused by interference or by distance from the base station. Thus, it may not be clear from the network profile influencing attribute measurements alone whether boosting power to the antenna will effectively improve the quality of the signal transmitted.

As described in an embodiment with reference to FIG. 4, the predictive attribute fusion algorithm 402 in an embodiment may determine a future state for each of the system characteristics 302-210 based on the predicted future states of each of the influencing attributes, and based on the known relationships between each system characteristic and each influencing attribute and/or other system characteristics. For example, the sensor fusion algorithm 402 may combine the predicted future states of each of the influencing attributes known to affect the state of the power status system characteristic 306 (e.g. power profiles, historical performance, functionality profile, location mapping, network profile, configuration adjustments, and application profile influencing attributes) in order to determine whether the combination of the predicted future states of those influencing attributes will likely cause a change in the state of the power status system characteristic 306. In such a way, the sensor fusion prediction based automatic adjustment system in embodiment of the present disclosure may predict an expected change in one or more information handling system characteristics 302-310, prior to such a change arising. By analyzing future states for each of the plurality of influencing attributes using a fusion algorithm, the predictive attribute fusion algorithm may determine future states of each of the system characteristics with a greater degree of certainty than methods of determining the future state of only one system characteristic at a time. This may be due to the interrelated nature of each of the system characteristics 302-310 in an embodiment.

The sensor fusion prediction based automatic adjustment system may determine in an embodiment at block 604 whether the current adjustable settings are optimized for the predicted future states of the system characteristics. For example, in an embodiment described with reference to FIG. 4, the current adjustable power setting 408 may be set to a low-power mode 414 that is not optimized for the predicted future values of the system characteristics 302-310. A current adjustable setting (e.g. 404-412) may be optimized for predicted system characteristics in an embodiment when the predicted future state of one or more system characteristics falls outside a known set of optimal operational bounds associated with the current adjustable setting. The optimal operational bounds of each adjustable setting (e.g. each of the tic marks shown in FIG. 4 within the adjustable settings 404-412) in an embodiment may be determined within a memory accessible by the predictive attribute fusion algorithm 402 prior to determination of the future states of each of the system characteristics 302-310.

Determination at block 604 that one or more adjustable settings are not optimized for the future values of each of the system characteristics, as predicted at block 602, may indicate a change in priorities or future need related to system performance that is not within the optimal bounds of the current adjustable settings 404-412. For example, the future state of the power status 306 system characteristic may indicate the information handling system is likely to be plugged into a continuous power source in the future, and that the activities the user will engage in at that time will consume a high level of processing resources, and thus, power. In such a scenario, the sensor fusion prediction based automatic adjustment system may determine use of the power hungry applications associated with the future predicted power status 306 falls outside the optimal operational bounds of the current low-power mode 414 setting. Such a high power need and access to a continuous power source in an embodiment may be within the optimal operational bounds of the full-power mode 416, however. If each of the current adjustable settings are found to be optimized for all of the predicted future states of the system characteristics 302-310 in an embodiment, no automatic adjustment of the adjustable settings may be necessary in order to optimize performance of the information handling system, and the method may end. However, if one or more current adjustable settings are not optimized for all of the predicted future states of the system characteristics 302-210, this may indicate a need for adjustment of one or more adjustable settings 404-412, and the method may proceed to block 606.

At block 606, the sensor fusion prediction based automatic adjustment system in an embodiment may identify an adjustable setting not optimized for future system characteristic states as an adjustable setting of interest. For example, in an embodiment in which it is determined use of the power hungry applications associated with the future predicted power status 306 falls outside the optimal operational bounds of the current low-power mode 414 setting, the power status system characteristic 306 may be identified at block 606 as a system characteristic of interest. In another example embodiment, the behavioral use system characteristic 302 may be identified as a system characteristic of interest if the future predicted state of the behavioral use 302 system characteristic includes streaming of UHD video and the current adjustable behavioral setting 404 is not optimized for that activity.

The sensor fusion prediction based automatic adjustment system may determine an adjustment that may be made to the adjustable setting of interest to optimize it for the future predicted state of the system characteristic at block 608. Again, the optimal operational bounds of each adjustable setting (e.g. each of the tic marks shown in FIG. 4 within the adjustable settings 404-412) in an embodiment may be determined within a memory accessible by the predictive attribute fusion algorithm 402 prior to determination of the future states of each of the system characteristics 302-310. The sensor fusion prediction based automatic adjustment system in an embodiment may access such information stored in the memory to identify at block 608 an adjustable setting (other than the current adjustable setting) for the setting of interest whose optimal operational bounds includes the predicted future states of the system characteristics that was determined at block 604 to fall outside the optimal operational bounds of the current adjustable setting. For example, in an embodiment in which the predicted future state of the power status 306 system characteristics describes anticipated use of power-hungry applications falling outside the optimal operational bounds of the current low-power mode 414 within the adjustable power setting 408, the sensor fusion prediction based automatic adjustment system may determine at block 608 that the anticipated use of the power-hungry applications falls within the optimal operational bounds of a full-power mode 416 setting.

In some embodiments, the method may then proceed directly to block 614, where the sensor fusion prediction based automatic adjustment system may automatically adjust the adjustable setting of interest to the setting determined at block 608 to include the predicted future state of all of the system characteristics within its optimal operational bounds. For example, the sensor fusion prediction based automatic adjustment system may automatically adjust the power setting 408 from the low-power mode 414 to the full-power mode 416 prior to the expected use of the power-hungry applications. In other embodiments, prior to performing the adjustment, the sensor fusion prediction based automatic adjustment system may determine whether such an adjustment will cause changes to the future states of other system characteristics, and the method may proceed to block 610 in order to optimize all changes made across all system characteristics to anticipate such interrelatedness.

At block 610, the sensor fusion prediction based automatic adjustment system in an embodiment may predict adjusted future values of all system characteristics based on the adjustment identified at block 608 to the adjustable setting of interest and known interrelationships between each of the system characteristics. The ways in which the values of a given system characteristic affect the value of each of the other system characteristics, or the relationship among the system characteristics may also be known and stored in the memory. The sensor fusion prediction based automatic adjustment system may access this stored relational information in order to determine the effect the adjustment identified at block 608 will have on each of the system characteristics when it is performed. For example, it may be determined at block 606 that a future behavioral use system characteristic indicates the user will likely use the information handling system at a future time to stream ultra-high definition (UHD) video. It may then be determined at block 608 that streaming UHD video falls outside the operational bounds of the current adjustable behavioral use setting 404, and that the adjustable setting 404 may need to be adjusted to a new setting whose optimal operational bounds includes streaming of UHD video.

The sensor fusion prediction based automatic adjustment system may access the information stored in memory describing the interrelation of the system characteristics 302-310 in such an embodiment at block 610 in order to determine what impact adjusting the behavioral setting 404 to the new setting whose optimal operational bounds includes streaming UHD video would have on the future predicted states of each of the system characteristics 302-310. For example, the current adjustable power setting 408 in an embodiment may be the low-power mode 414. It may be determined at block 610 that the adjustable behavioral setting 404 will likely be adjusted to allow for streaming of UHD video in the future, which in turn will cause the predicted power status 306 system characteristic to change such that additional power is diverted to the GPU and display for processing and display of such UHD video. Diversion of power to the GPU and display in such a manner may fall outside the optimal operational bounds of the currently set low-power mode 414. The sensor fusion prediction based automatic adjustment system in such an embodiment may need to also perform an adjustment to the adjustable power setting 408, in addition to the adjustment for the behavioral use setting 404 identified at block 608. If it is determined at block 612 that performing the adjustment identified at block 608 does not cause a need for further adjustments, the method may proceed to block 614.

If performing the adjustment identified at block 608 is determined at block 612 to require an adjustment to another adjustable setting associated with one or more other system characteristics, the method may proceed back to block 606 in order to identify that adjustment. For example, in an embodiment in which it is determined at block 612 that the sensor fusion prediction based automatic adjustment system may need to perform an adjustment to the adjustable power setting 408 in addition to the adjustment for the behavioral use setting 404 previously identified at block 608, the method may proceed back to block 606 where the adjustable power setting 408 is identified as the adjustable setting of interest. The method may then loop between 606 and 612 until none of the predicted future system characteristic determined during the most recent loop at block 610 falls outside the optimal operational bounds of the adjustable settings 404-412, once the adjustments identified at block 608 throughout the various loops are performed. For example, in a second loop in which the adjustable power setting 408 is identified as the adjustable setting of interest, the sensor fusion prediction based automatic adjustment system may determine at block 608 that diversion of power to the GPU and display for processing and display of UHD video falls within the operational bounds of the full-power mode 416. In such an embodiment, an adjustment of the power setting 408 from the low-power mode 414 to the full-power mode 416 may be needed in order to accommodate the adjustment of the behavioral use setting 404 determined in the previous loop. At block 610 in such an embodiment, the sensor fusion prediction based automatic adjustment system may predict the adjusted future values of all of the system characteristics based on both the adjustment to the behavioral use settings 404 determined in the previous loop and the adjustment to the full-power mode 416. The sensor fusion prediction based automatic adjustment system in such an embodiment may then determine at block 612 that each of the predicted system characteristics predicted in the immediately preceding block 610 fall within the operational bounds of the current performance setting 406, current security setting 410, and configuration setting 412, as well as within the adjusted behavioral setting 404 identified in the previous loop, and the adjustment to the full-power mode 416 identified in the current loop. In such a scenario, the method may then proceed to block 614.

In some embodiments, it may not be possible to accommodate all predicted future states of each of the system characteristics 302-310 because their predicted states are associated with competing needs. For example, the future power status system characteristic in an embodiment may indicates the information handling system will likely be operating on battery power alone, while the future behavioral use system characteristic indicates the user will begin streaming UHD video. In such an embodiment, it may be determined at block 608 that streaming UHD video may cause the future predicted state of the power status 306 characteristic to reflect a need for more power diverted to the GPU and display for processing and display of the UHD video. In such a scenario, the optimal operational bounds for the adjustable power setting within which reliance on battery power falls (e.g. low-power mode 414) may not include diversion of power to the GPU and display for processing and display of the UHD video. Similarly, the optimal operational bounds for the adjustable power setting within which diversion of power to the GPU and display for processing and display of the UHD video falls (e.g. full-power mode 416) may not include reliance on battery power alone. In other words, in such an embodiment, neither the low-power mode 414, nor the full-power mode 416 may allow for simultaneous reliance on battery power alone (as predicted by the future state of the power status 306 system characteristic) and streaming of UHD video (as predicted by the future state of the behavioral use 302 system characteristic). In such an embodiment, the predictive attribute fusion algorithm may attempt to balance these competing needs in order to determine a combination of adjustable settings for multiple system characteristics that places the total operational bounds of the information handling system closest to the desirable operation defined by the plurality of predicted future system characteristic values. Such a determination may be made using a closed-loop, iterative process to identify one of the possible combinations of adjustable settings 404-412 likely to produce optimal operational bounds for the information handling system. For example, a Kalman filter, a neural network, or machine learning algorithm employing a gradient-descent method may be used to make such a prediction of such future states.

In an embodiment in which one or more adjustments to system characteristic policies are identified as necessary or preferred at block 610, the sensor fusion prediction based automatic adjustment system may automatically perform the expected adjustment of the policy controlling the system characteristic of interest at block 614. For example, if it has been determined that the power status system characteristic 306 will likely need to move from the low-power mode 414 to the full-power mode 416 in an embodiment, the sensor fusion prediction based automatic adjustment system may automatically shift the power status system characteristic from the low-power mode 414 to the full-power mode 416, without intervention from the user. In an embodiment in which one or more adjustments have been identified at block 608 during one or more loops of the method between blocks 606 and 612, the sensor fusion prediction based automatic adjustment system may perform the adjustments identified at block 608 in each of those loops at block 612. For example, if a first loop of the method from block 606 to 612 indicates an adjustment needs to be made to the behavioral settings 404, and a second loop of blocks 606 to 612 indicates a need to shift from the low-power mode 414 to the full-power mode 416, the sensor fusion prediction based automatic adjustment system may automatically perform both of these adjustments to the behavior setting 404 and the power setting 408 at block 614.

Adjustments made to any of the settings 404-412 in an embodiment made at block 614 may prompt a change to an existing policy, mode, setting, or configuration. For example, each possible policy setting for each system characteristic may be associated with one or more policies dictating operation of software or firmware. As another example, an adjustment to one or more settings 404-412 may prompt a change in configuration (e.g. which security requirements are in place), or configuration (e.g. whether external devices such as displays can be used). As yet another example, an adjustment may result in changes to operational modes of one or more components (e.g. setting a network adapter to communicate via only WLAN or WWAN, rather than LTE). Each of the possible settings (e.g. each tic mark along each adjustable setting 404-412) may be associated with a predetermined policy, mode, setting or configuration, and such an association may be stored in memory. When a new setting is chosen (e.g. one of the tic marks along the adjustable settings 404-412), the sensor fusion prediction based automatic adjustment system may determine which policies, modes, settings, and/or configurations are associated with the new or adjusted setting for the system characteristic, and institute that policy, mode, setting, and/or configuration as the current policy, mode, setting, or configuration.

Such automatic adjustment may be performed prior to the time at which the need to do so arises (e.g. before the predicted future state of the system characteristic disallowed by current policies occurs). In such a way, the sensor fusion prediction based automatic adjustment system may adjust the functionality of the information handling system without the user experiencing low-quality performance, and without the user having to manually change any settings of the system. The sensor fusion prediction based automatic adjustment system in embodiments of the present disclosure may thus anticipate such a needed system characteristic adjustment prior to such a need arising, and automatically perform such an adjustment, providing seamlessly optimized performance of the information handling system.

The blocks of the flow diagrams 5-6 discussed above need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram. Further, those of skill will understand that additional blocks or steps, or alternative blocks or steps may occur within the flow diagrams discussed for the algorithms above.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system operating a sensor fusion prediction based automatic adjustment system of information handling system performance comprising:

a plurality of sensors disposed to monitor hardware components and executing software systems of the information handling system measuring a plurality of influencing attributes including a digital chronometer for providing hour/day measurements, a GPS sensor providing location measurements, an accelerometer providing measurements of a current positional configuration of the information handling system such as clamshell mode, tablet mode, or tent mode, and an antenna front end sensor providing communication link quality measurements, wherein a subset of the influencing attributes influence one of a plurality of information handling system characteristics;

a memory device storing definitions of the plurality of information handling system characteristics including a user behavior characteristic describing a value for a location and time of usage of an information handling system and tasks performed by the information handling system corresponding to those places and times, a performance mapping characteristic describing a value for hardware component prioritization among hardware processor, memory, and network interface adapter corresponding to detected tasks performed by the information handling system, a power status characteristic describing a value for power consumption levels by hardware components of the information handling system during performance of tasks, a security profile characteristic describing a value for security required to access and use the information handling system, and a configuration characteristic describing a value for configuration of hardware components and software on the information handling system;

a hardware processor executing code instructions of the sensor fusion prediction based automatic adjustment system with a machine learning classifier to:

input the subset of influencing attributes to the machine learning classifier code instructions to classify influencing attributes to correspond to the hardware components and software systems with state values for the plurality of information handling system characteristics to yield classified influencing attributes;

with the classified influencing attributes, apply a stochastic prediction machine learning algorithm to the subset of influencing attribute values to predict a future value for a state of at least one of the plurality of information handling system characteristics influenced by the subset of influencing attribute values at a future instance in time;

determine a first adjustment to a policy controlling operational bounds of a first information handling system characteristic for the information handling system if the predicted future value for the state of a first information handling system characteristic output from the stochastic prediction machine learning algorithm falls outside current policy-defined operating bounds indicating aberrant operation; and automatically perform the first adjustment to the first information handling system characteristic for the information handling system prior to occurrence of the future instance in time to avoid the value for the state of the first information handling system characteristic reaching aberrant operation of the corresponding hardware component or software system associated with the first information handling system characteristic.

2. The information handling system of claim 1 further comprising:

the hardware processor executing code instructions to:
apply a predictive attribute fusion algorithm to determine, based on a known relationship between each of the plurality of information handling system characteristics corresponding hardware components or software systems, the adjustment to the first information handling system characteristic causes a need for a second adjustment of a second information handling system characteristic of second corresponding hardware component or software system; and automatically perform the second adjustment to the second information handling system characteristic for the second corresponding hardware component or software system prior to occurrence of the future instance in time to avoid the value for the state of the second information handling system characteristic reaching aberrant operation of the corresponding second hardware component or second software system associated with the second system characteristic.

3. The information handling system of claim 1 further comprising:
the hardware processor executing a closed-loop, iterative process to predict the future value for the state of each of the plurality of information handling system characteristics corresponding to a plurality of hardware components or software systems based on the measured plurality of influencing attributes.

4. The information handling system of claim 3, wherein the closed-loop, iterative process is a neural network analysis of the measured plurality of influencing attributes.

5. The information handling system of claim 3, wherein the closed-loop, iterative process is a logistic or linear regression technique.

6. The information handling system of claim 1 further comprising:

the hardware processor performing an iterative statistical inference method to determine the relationship between each influencing attribute and each system characteristic.

7. The information handling system of claim 1, wherein iterative statistical inference method is a gradient descent algorithm.

8. A method of automatically adjusting information handling system characteristics of an information handling system based on a sensor fusion prediction, comprising:

measuring a plurality of influencing attributes via a plurality of sensors detecting operation of the information handling system including a digital chronometer for providing hour/day measurements, a GPS sensor providing location measurements, an accelerometer providing measurements of a current positional configuration of the information handling system such as clamshell mode, tablet mode, or tent mode, and an antenna front end sensor providing communication link quality measurements;

determining, via a hardware processor executing code instructions, a subset of the influencing attributes that influence a first information handling system characteristic selected from a plurality of information handling system characteristics relating to hardware components or software systems of the information handling system;

storing in a memory device definitions of the plurality of information handling system characteristics including a user behavior characteristic describing a value for location and time of usage of an information handling system and tasks performed by the information handling system corresponding to those places and times, a performance mapping characteristic describing a value for a value for hardware component prioritization among hardware processor, memory, and network interface adapter corresponding to detected tasks performed by the information handling system, a power status characteristic describing a value for power consumption levels by hardware components of the information handling system during performance of tasks, a security profile characteristic describing a value for security required to access and use the information handling system, and a policy configuration characteristic describing a value for configuration of hardware components and software on the information handling system;

executing code instructions of an iterative, closed-loop stochastic prediction machine learning algorithm with the subset of influencing attribute values as input, via the hardware processor, to predict a future value of a state of the first information handling system characteristic for a first hardware component or software component of the information handling system influenced by the subset of influencing attribute values at a future instance in time as output;

determining, via the hardware processor, a first adjustment to operation of the first information handling system characteristic if the predicted future value of the state of the first information handling system characteristic falls outside current policy-defined operating bounds indicating aberrant operation; and automatically performing the first adjustment to the operation of the first information handling system characteristic for the corresponding hardware component or software system, via the hardware processor, prior to occurrence of the future instance in time to avoid the value for the state of the first information handling system characteristic reaching aberrant operation of the corresponding hardware component or software system associated with the first information handling system characteristic.

9. The method of claim 8 further comprising:
applying a predictive attribute fusion algorithm, via the hardware processor, to determine, based on a known relationship between each of the plurality of information handling system characteristics, the adjustment to the operation of the first system characteristics causes a need for a second adjustment of operation of a second information handling system characteristic for a second hardware component or a second software system of the information handling system; and
automatically performing the second adjustment to the operation of the second information handling system characteristic, via the hardware processor, prior to occurrence of the future instance in time.

10. The method of claim 8 further comprising:
performing, via the hardware processor, an iterative statistical inference method to determine a relationship between each influencing attribute and each information handling system characteristic.

11. The method of claim 8, wherein the closed-loop, iterative stochastic prediction is a gradient-descent method executed via a neural network.

12. The method of claim 8, wherein the closed-loop, iterative stochastic prediction is a linear discriminant analysis.

13. The method of claim 8, wherein the closed-loop, iterative stochastic prediction is a classification tree method.

14. The method of claim 8, wherein the closed-loop, iterative stochastic prediction is a regression tree method.

15. An automatic adjustment system based on a sensor fusion prediction, comprising:
a network adapter receiving data for a plurality of influencing attributes including a digital chronometer for providing hour/day measurements, a GPS sensor providing location measurements, an accelerometer providing measurements of a current positional configuration of the information handling system such as clamshell mode, tablet mode, or tent mode, and an antenna front end sensor providing communication link quality measurements for operation of a remote information handling system, wherein a subset of the influencing attributes influences a first information handling system characteristic of a plurality of information handling system characteristics relating to hardware components or software systems for the remote information handling system, wherein the plurality of information handling system characteristics includes a user behavior characteristic describing a value for location and time of usage of an information handling system and tasks performed by the information handling system corresponding to those places and times, a performance mapping characteristic describing a value for a value for hardware component prioritization among hardware processor, memory, and network interface adapter corresponding to detected tasks performed by the information handling system, a power status characteristic describing a value for power consumption levels by hardware components of the information handling system during performance of tasks, and a security profile characteristic describing a value for security required to access and use the information handling system;
a hardware processor executing code instructions of a stochastic prediction machine learning algorithm to the received subset of influencing attribute values to predict a future value of a state for the first information handling system characteristic for a first hardware component or a first software system of the remote information handling system influenced by the subset of received influencing attribute values at a future instance in time;
the hardware processor executing code instructions to generate an instruction for a first adjustment to operation of the first information handling system characteristic for the first hardware component or first software system of the remote information handling system if the predicted future value of the state of the first information handling system characteristic falls outside current policy-defined operating bounds indicating aberrant operation; and
the network adapter transmitting to the remote information handling system the instruction to automatically perform the first adjustment to the operation of the first information handling system characteristic for the first hardware component or first software system at the remote information handling system prior to occurrence of the future instance in time to avoid reaching the aberrant operation.

16. The information handling system of claim 15, further comprising:
the hardware processor executing code instructions of a sensor fusion algorithm to determine, based on a known relationship between each of the plurality of information handling system characteristics, an adjustment to the operation the first information handling system characteristic causes a need for a second adjustment of operation of a second information handling system characteristic for a second hardware component or a second software system; and
the network adapter transmitting to the remote information handling system a second instruction to automatically perform the second adjustment to the operation the second information handling system characteristic for the second hardware component or the second software system at the remote information handling system.

17. The information handling system of claim 15, wherein the sensor fusion algorithm is a Kalman filter algorithm.

18. The information handling system of claim 15, wherein the sensor fusion algorithm is a Dempster-Shafer algorithm.

19. The information handling system of claim 15, wherein the sensor fusion algorithm is a Statistical inference network algorithm.

20. The information handling system of claim 15, wherein the sensor fusion algorithm is a convolutional neural network algorithm.

* * * * *